(12) United States Patent
Molnar et al.

(10) Patent No.: US 12,448,347 B2
(45) Date of Patent: Oct. 21, 2025

(54) POLYMORPHIC FORMS OF (R)-OXYBUTYNIN HYDROCHLORIDE

(71) Applicant: APNIMED, INC. (DELAWARE), Cambridge, MA (US)

(72) Inventors: Dennis Molnar, Hopkinton, NH (US); Sean Johnston, Doylestown, PA (US)

(73) Assignee: APNIMED, INC. (DELAWARE), Cambridge, MA (US)

( * ) Notice: Subject to any disclaimer, the term of this patent is extended or adjusted under 35 U.S.C. 154(b) by 257 days.

(21) Appl. No.: 17/923,284

(22) PCT Filed: May 4, 2021

(86) PCT No.: PCT/US2021/030571
§ 371 (c)(1),
(2) Date: Nov. 4, 2022

(87) PCT Pub. No.: WO2021/226020
PCT Pub. Date: Nov. 11, 2021

(65) Prior Publication Data
US 2023/0286900 A1    Sep. 14, 2023

Related U.S. Application Data

(60) Provisional application No. 63/136,691, filed on Jan. 13, 2021, provisional application No. 63/020,301, filed on May 5, 2020.

(51) Int. Cl.
C07C 219/22    (2006.01)
C07C 213/08    (2006.01)

(52) U.S. Cl.
CPC .......... C07C 219/22 (2013.01); C07C 213/08 (2013.01); *C07B 2200/13* (2013.01)

(58) Field of Classification Search
CPC .. C07C 219/22; C07C 213/08; C07B 2200/13
See application file for complete search history.

(56) References Cited

U.S. PATENT DOCUMENTS

| | | | |
|---|---|---|---|
| 3,176,019 | A | 3/1965 | Campbell et al. |
| 5,736,577 | A | 4/1998 | Aberg et al. |
| 5,811,547 | A | 9/1998 | Nakamichi et al. |
| 6,124,355 | A | 9/2000 | Guittard et al. |
| 6,140,529 | A | 10/2000 | Bakale et al. |
| 8,877,235 | B2 | 11/2014 | Aida et al. |
| 2001/0031787 | A1 | 10/2001 | Tsung-Min et al. |
| 2003/0203899 | A1 | 10/2003 | Del Soldato Piero et al. |
| 2005/0287185 | A1 | 12/2005 | Wong et al. |
| 2007/0048360 | A1 | 3/2007 | R. Carrara et al. |
| 2009/0247628 | A1 | 10/2009 | Gant et al. |

FOREIGN PATENT DOCUMENTS

| | | |
|---|---|---|
| CN | 1454054 A | 11/2003 |
| CN | 104370760 A | 2/2015 |
| CN | 104955444 A | 9/2015 |
| IN | 201001305 | 2/2013 |
| IN | 200902349 | 12/2013 |
| JP | 2003535110 A | 11/2003 |
| JP | 2012176958 A | 9/2012 |
| WO | 2001062236 A2 | 8/2001 |
| WO | 2003039436 | 5/2003 |
| WO | 2006047427 A1 | 5/2006 |
| WO | 2009122429 A2 | 10/2009 |
| WO | 2018/200775 | 11/2018 |

OTHER PUBLICATIONS

US 8,513,455 B2, 08/2013, Chandra et al. (withdrawn)
PCT/US2021/030571 International Search Report dated Jul. 19, 2021.
China 202180038499.3 Search Report dated Dec. 10, 2024.
United Arab Emirates P6002274/2022 Search Report dated Nov. 25, 2024.
Imran Ali, et al., "Enantiomeric separation and simulation studies of pheniramine, oxybutynin, cetirizine, and brinzolamide chiral drugs on amylose-based columns", Chirality, vol. 26, No. 3, pp. 136-143, DOI: 10.1002/chir.22276, Jan. 26, 2014 (Jan. 26, 2014.
Alza Corp., FDA Ditropan Oxybutynin Chloride Tablets, Feb. 1, 2008.
Anonymous, Wikipedia, Oxybutynin, retrieved from the internet: URL:https://en.wikipedia.org/w/index.php?title=Oxybutynin&oldid=822003676 [retrieved on Dec. 7, 2022], pp. 1-7, XP093006009, Jan. 23, 2018.
clinical trials.gov[online], Anonymous; Atomoxetine and oxybutynin in obstruction sleep apnea (ATOSA),, Sep. 21, 2016, retrieved on Jun. 24, 2020, retrived from URL<https://clinicaltrials.gov/ct2/show/NCT02908529?term=atomoxetine%2C+oxybutynin&cond=sleep+apnea&rank=1>, 7 pgs; NCT02908529 version of Jan. 17, 2018; Jan. 19, 2018, XP055584738; retrieved from the internet: URL<https://clinicaltrials.gov/ct2/history/NCT02908529?A=3&B=3&C=merged#StudyPageTop; retrieved on Apr. 30, 2019.
Cruz-Cabeza, A.J., et al., Facts and fictions about Polymorphism, Chem. Soc. Rev., 44,8619-8635, The Royal Society of Chemistry, Sep. 24, 2015.
EMA Scientific Guideline, Investigation of Chiral Active Substances 1993.
Kennelly, M.J., NIH A Comparative Review of Oxybutynin Chloride Formulations: Pharmacokinetics and Therapeutic Efficacy in Overactive Bladder, MedReviews, Reviews in Urology, vol. 12, No. 1, 2010.
Luner, P.E., et al., Preformulation Studies on the S-Isomer of Oxybutynin Hydrochloride, an Improved Chemical Entity (ICE™), Drug Development and Industrial Pharmacy, 27(4), pp. 321-329, Marcel Dekker, inc., 2001.

(Continued)

*Primary Examiner* — Sikarl A Witherspoon
(74) *Attorney, Agent, or Firm* — Honigman LLP

(57) ABSTRACT

Polymorphic forms of (R)-oxybutynin HCl, including three crystalline forms, are prepared and characterized. Uses of the various polymorphic forms of (R)-oxybutynin HCl for Obstructive Sleep Apnea (OSA) treatment are also disclosed.

38 Claims, 14 Drawing Sheets

(56) References Cited

OTHER PUBLICATIONS

Martin, Richard J., et al., Effect of Ipratropium Bromide Treatment on Oxygen Saturation and Sleep Quality in COPD*, Clinical Investigations, Chest, vol. 115, No. 5, pp. 1338-1345, May 1999.
Sangal, et al., "Atomoxetine Improves Sleepiness and Global Severity of Illness but Not the Respiratory Disturbance Index in Mild to Moderate Obstructive Sleep Apnea With Sleepiness," Sleep Med., Jul. 2008, 9 (5):506-510 (XP022762505) Elsevier.
Sitadevi, P., et al., Development and validation of a method for the enantioseparation of oxybutynin hydrochloried by HPTLC, Analytical Chemistry: An Indian Journal, vol. 9, No. 3, Dec. 31, 2010.
Taranto-Montemurro, Luigi, et al., The Combination of Atomoxetine and Oxybutynin Greatly Reduces Obstructive Sleep Apnea Severity: A Randomized, Placebo-Controlled, Double-Blind Crossover Trial; Am J of Respiratory & Critical Care Medicine, Am Thoracic Society; vol. 199, No. 10, Nov. 5, 2018, pp. 1-45.
Zha, S., et al., Combined noradrenergic plus antimuscarinic agents for obstructive sleep apnea—A systematic review and meta-analysis of randomized controlled trials, Sleep Medicine Reviews, vol. 64, The Authors, Elsevier Ltd., 2022.
Taiwan 110116219 Search Report dated Feb. 3, 2025.
Ashizawa/Byrn, Solid-State Chemistry of Drugs, 1982, Iyakuhin no Takei Gensho to Shouseki no Kagaku, Chemistry of Polymorphism and Crystallization of Medicine, pp. 273, 278, and 305-317, 2002.
Braga, D., et al., Crystal Polymorphism and Multiple Crystal Forms, Struct Bond 132: 25-50, Springer-Verlag Berlin Heidelberg, Feb. 25, 2009.
Byrn, S., et al., Pharmaceutical Solids: A Strategic Approach to Regulatory Considerations, Pharmaceutical Research, vol. 12, No. 7, pp. 945-954, Plenum Publishing Corporation, 1995.
Caira, M.R., Crystalline Polymorphism of Organic Compounds, Topics in Current Chemistry, vol. 198, Springer Verlag Berlin Heidelberg, 1998.
Chrom Analytics Technology, Chiral Application Handbook, Chrom Analytics, A Comprehensive Guide on Chiral HPLC Separations, https://www.chromtech.net.au/pdf2/CT_Chiral-Handbook_1-40A.pdf, 2012.
Hilfker, R., et al., Relevance of Solid-State Properties for Pharmaceutical Products, Polymorphism: in the Pharmaceutical Industry, Wiley-VCH Verlga GmbH & Co. KGaA, 2006.
Hirayama, N., Yuuki Kagoubutsu Kesshou Sakusei Handobukku (Handbook of preparation of organic compound crystals), pp. 17-23, 37-40, 45-51, and 57-65, 2008.
Kaduk, J.A., et al., Crystal structure of oxybutynin hydrochloride hemihydrate, $C_{22}H_{32}NO_3Cl \cdot (H_2O)_{0.5}$, Powder Diffraction, 34(1), 50-58, Mar. 2019.
Ministry of Health & Welfare, Pharmaceutical and Medical Safety Bureau, Pharmaceutical Evaluation Division, Guideline for Residual Solvent for Pharmaceuticals, 1998.
Wermuth/Anderson, The Practice of Medicinal Chemistry, book two of two, Technomics, Inc., pp. 347-365, 1999.

POLYMORPHIC FORMS OF (R)-OXYBUTYNIN HYDROCHLORIDE

CROSS-REFERENCE TO RELATED APPLICATIONS

This application is a National Stage Application and claims priority under 35 U.S.C. § 371 to Patent Cooperation Treaty application PCT/US2021/030571, filed May 4, 2021, which claims the benefit of and priority to U.S. provisional application 63/020,301, filed May 5, 2020, and U.S. provisional application 63/136,691, filed Jan. 13, 2021. Priority is claimed to each of these applications and the disclosures of these prior applications are considered part of the disclosure of this application, and to the extent allowed, the entire contents of the aforementioned applications are incorporated herein.

TECHNICAL FIELD

The present invention provides various polymorphic forms of (R)-oxybutynin, along with pharmaceutical compositions thereof, preparation methods thereof, and uses thereof.

BACKGROUND

Oxybutynin and its derivatives are typically taken by mouth or applied to the skin and are applicable as bronchodilators or a remedy for overactive bladder. In addition, oxybutynin exerts a direct antispasmodic effect on various forms of smooth muscle, mainly by inhibiting the action of acetylcholine on smooth muscle as an anti-cholinergic drug and the like. Oxybutynin is marketed in the hydrochloride form. The chemical name for oxybutynin is 4-(diethylamino) but-2-yn-1-yl 2-cyclohexyl-2-hydroxy-2-phenylacetate for which the chemical structure is provided below as I:

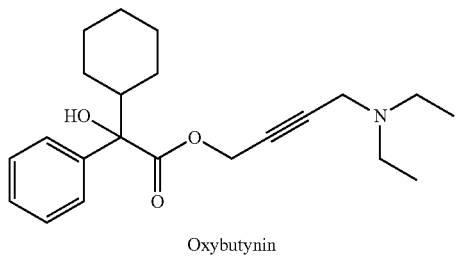

Oxybutynin

BRIEF DESCRIPTION OF THE DRAWINGS

The following figures are provided by way of example and are not intended to limit the scope of the claimed invention.

DETAILED DESCRIPTION

I. Polymorphic Forms of (R)-Oxybutynin HCl

Figure 1:
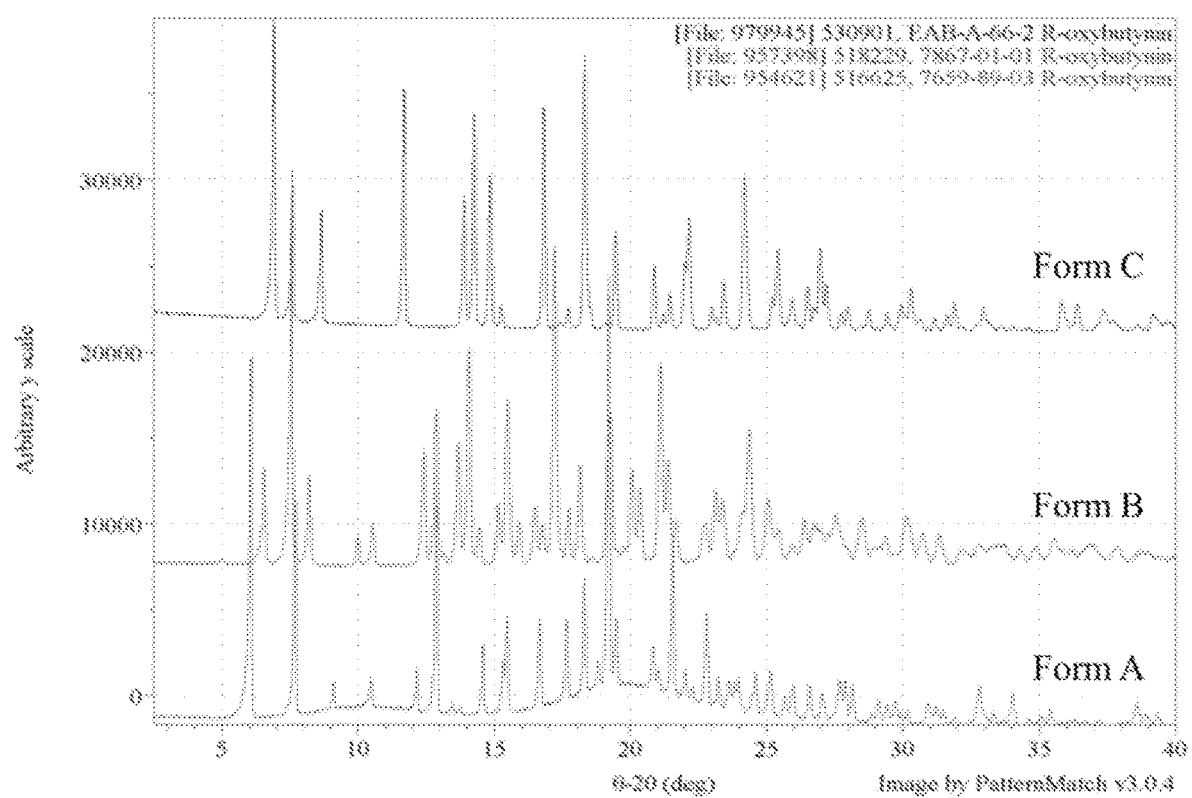
FIG. 1: Overlay of XRPD patterns obtained from the crystalline Form A, B, and C polymorphs of (R)-oxybutynin HCl.

As set forth in the Example section below, three crystalline forms of (R)-oxybutynin HCl were prepared and characterized. The (R) enantiomer of Oxybutynin hydrochloride is provided below as II:

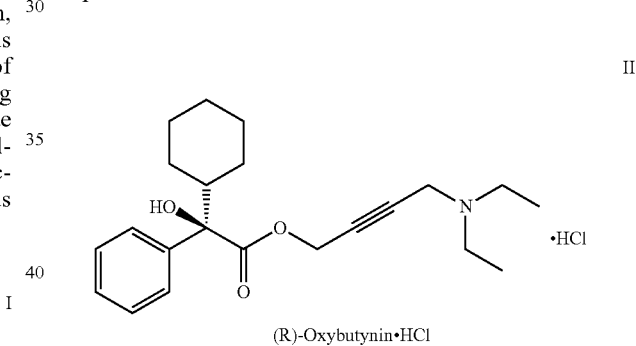

(R)-Oxybutynin•HCl

The definitions provided herein are meant to clarify, but not limit, the terms defined. If a term used herein is not specifically defined, such term should not be considered indefinite. Rather, terms are used within their accepted meanings.

As used herein, (R)-oxybutynin HCl refers to a hydrochloride salt form wherein the molar ratio of (R)-oxybutynin and HCl is approximately 1, e.g., from about 0.75 to about 1.25, from about 0.9 to about 1.1, from about 1.0 to about 1.25, or from 0.75 to about 1.0. Small changes in the amount of assayed HCl can be attributed to, without limitation, measurement variability and loss of small amounts of HCl through storage and/or processing.

In some embodiments, the (R)-oxybutynin free base can be converted into a salt by conventional methods. The term "salt", as used herein, is not intended to be limited as long as the salt formed with (R)-oxybutynin is pharmacologically acceptable. In some embodiments, the salts may include hydrohalide salts (e.g., HCl, HBr, and the like), citrate salt or other organic carboxylate salts (e.g., acetate, maleate, tartrate, fumarate, and the like), inorganic acid salts (e.g., sulfate, nitrate, perchlorate, phosphate, and the like), organic sulfonate salts (e.g., methanesulfonate, ethanesulfonate, benzenesulfonate, and the like), amino acid salts (e.g., aspartate, glutamate, and the like), alkaline metal salts (e.g., sodium, potassium, and the like), and/or alkaline earth metal salts (e.g., magnesium, calcium, and the like). In some embodiments, the pharmacologically acceptable salt of (R)-oxybutynin is (R)-oxybutynin HCl. In other embodiments, the pharmacologically acceptable salt of (R)-oxybutynin is (R)-oxybutynin citrate.

As used herein, "crystalline" refers to a solid having a highly regular chemical structure. In particular, a crystalline free base or salt form may be produced as one or more single crystalline forms. For the purposes of this application, the terms "crystalline form", "single crystalline form" and "polymorph" are synonymous; the terms distinguish between crystals that have different properties (e.g., different XRPD patterns and/or different DSC scan results). The term "polymorph" includes pseudopolymorphs, which are typically different solvates of a material, and thus their properties differ from one another. Thus, each distinct polymorph and pseudopolymorph of a free base or salt form is considered to be a distinct single crystalline form herein. In some embodiments, a solid form is a solid crystalline form.

The term "ambient relative humidity" refers to the ratio of the partial pressure of water vapor to the equilibrium pressure of the water at a given temperature. In some embodiments, the ambient relative humidity at room temperature is from about 0% to about 100%, from about 25% to about 75%, from about 0% to about 50%, from about 50% to about 100%, or from about 40% to about 65%.

The term "substantially crystalline" refers to forms that may be at least a particular weight percent crystalline. Particular weight percentages are 10%, 20%, 30%, 40%, 50%, 60%, 70%, 75%, 80%, 85%, 87%, 88%, 89%, 90%, 91%, 92%, 93%, 94%, 95%, 96%, 97%, 98%, 99%, 99.5%, 99.9%, or any percentage between 10% and 100%. In some embodiments, substantially crystalline refers to a free base or salt form that is at least 70% crystalline. In other embodiments, substantially crystalline refers to a free base or salt form that is at least 90% crystalline.

As used herein, "amorphous" refers to a solid material comprising non-crystalline materials. In certain embodiments, an amorphous sample of a material may be prepared by lyophilization of a mixture of the material with a solvent, wherein the mixture may be homogeneous (e.g., solution) or heterogeneous (e.g., a slurry).

The term "substantially free" refers to forms and compositions that may be at least a particular weight percent free of impurities and/or crystalline compound. Particular weight percentages are 60%, 70%, 75%, 80%, 85%, 87%, 88%, 89%, 90%, 91%, 92%, 93%, 94%, 95%, 96%, 97%, 98%, 99%, 99.5%, 99.9%, or any percentage between 60% and 100% free of impurities and/or crystalline compound. In some embodiments, substantially free refers to a free base or salt form that is at least 70% pure. In other embodiments, substantially free refers to a free base or salt form that is at least 90% pure. In other embodiments, substantially free of crystalline compound refers to a composition having less than about 30%, less than about 20%, less than about 15%, less than about 10%, less than about 5%, less than about 1% of crystalline compound.

The term "hydrate" is a solvate wherein the solvent molecule is $H_2O$ that is present in a defined stoichiometric or non-stoichiometric amount. Stoichiometric solvates may, for example, include hemihydrate, monohydrate, dihydrate, or trihydrate forms, among others. Non-stoichiometric solvates may include, for example, channel hydrates, including where water content may change depending on humidity of the environment. In some embodiments, the (R)-oxybutynin salt may exist as a hemihydrate, monohydrate, dihydrate, or trihydrate forms.

The term "solvate or solvated" means a physical association of a compound, including a crystalline form thereof, of this invention with one or more solvent molecules. This physical association includes hydrogen bonding. In certain instances the solvate will be capable of isolation, for example when one or more solvent molecules are incorporated in the crystal lattice of the crystalline solid. "Solvate or solvated" encompasses both solution-phase and isolable solvates. Representative solvates include, for example, a hydrate, ethanolates or a methanolate.

The term "stable" in the context of a polymorphic form disclosed herein refers to the stability of the polymorphic form, for example relative to heat and/or humidity.

As used herein, crystalline forms of (R)-oxybutynin HCl are referred to as Forms A, B, and C, respectively. Form A is an isopropanol solvate polymorph, which was prepared by the reaction of (R)-oxybutynin dissolved in isopropanol with hydrochloric acid at 20-25° C. Form B is a de-solvated polymorph, which was prepared by the fast evaporation of Form A dissolved in toluene or upon vacuum drying of Form A at ambient temperature. The Form C polymorph was prepared by the reaction of (R)-oxybutynin dissolved in methyl t-butyl ether (MTBE) with hydrochloric acid at about 35° C. Forms A, B, and C showed different X-ray powder diffraction (XRPD) patterns as provided in FIG. 1.

In many embodiments disclosed herein, (R)-oxybutynin HCl is disclosed as having a crystalline structure.

In certain embodiments, crystalline structures in this disclosure can be identified by having one or more characteristics peaks in an XRPD spectrum, as disclosed herein.

In some embodiments, crystalline structures in this disclosure have one or more characteristics endothermic peaks in differential scanning calorimetry, as disclosed herein.

In certain embodiments, methods of preparing and/or interconverting one or more crystalline forms of (R)-oxybutynin HCl are provided. Further embodiments describe the conversion to, and preservation of a crystalline form of (R)-oxybutynin HCl that has desired stability under expected storage conditions.

Certain embodiments disclosed herein provide a solid form of (R)-oxybutynin HCl, having an X-ray powder diffraction pattern comprising a peak, in terms of 2θ, at 6.9 degrees 2θ±0.2 degrees 2θ at about ambient relative humidity, e.g., Form C.

Certain embodiments disclosed herein provide a solid form of (R)-oxybutynin HCl, having an X-ray powder diffraction pattern comprising a peak, in terms of 2θ, at 6.9 degrees 2θ±0.2 degrees 2θ, and/or 18.3 degrees 2θ±0.2 degree 2θ at about ambient relative humidity, e.g., Form C.

Certain embodiments disclosed herein provide a solid form of (R)-oxybutynin HCl, having an X-Ray powder diffraction pattern comprising at least two peaks (e.g., 2 or 3 peaks), in terms of 2-theta, selected from the group consisting of 6.9 degrees 2θ±0.2 degree 2θ, 18.3 degrees 2θ±0.2 degree 2θ and 11.7 degrees 2θ±0.2 degree 2θ at about ambient relative humidity, e.g., Form C.

Certain embodiments disclosed herein provide a solid form of (R)-oxybutynin HCl, having an X-Ray powder diffraction pattern comprising at least three peaks (e.g., 3, 4 or 5 peaks), in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ and 14.2 degrees 2θ±0.2 degree 2θ, at about ambient relative humidity, e.g., Form C.

Certain embodiments disclosed herein provide a solid form of (R)-oxybutynin HCl, having an X-Ray powder diffraction pattern comprising at least four peaks (e.g., 4, 5, 6 or 7 peaks), in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, and 14.8 degrees 2θ±0.2 degree 2θ, at about ambient relative humidity, e.g., Form C.

Certain embodiments disclosed herein provide a solid form of (R)-oxybutynin HCl, having an X-Ray powder diffraction pattern comprising at least five peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, and 13.9 degrees 2θ±0.2 degree 2θ, at about ambient relative humidity, e.g., Form C.

Certain embodiments disclosed herein provide a solid form of (R)-oxybutynin HCl, having an X-Ray powder diffraction pattern comprising at least seven peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Certain embodiments disclosed herein provide a solid form of (R)-oxybutynin HCl, having an X-Ray powder diffraction pattern comprising at least eight peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Certain embodiments disclosed herein provide a solid form of (R)-oxybutynin HCl, having an X-Ray powder diffraction pattern comprising at least nine peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Certain embodiments disclosed herein provide a solid form of (R)-oxybutynin HCl, having an X-ray powder diffraction pattern comprising the peaks, in terms of 2-theta, of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, 8.7 degrees 2θ±0.2 degree 2θ, 22.2 degrees 2θ±0.2 degree 2θ, and 19.5 degrees 2θ±0.2 degree 2θ, at about ambient relative humidity, e.g., Form C.

Certain embodiments disclosed herein provide a solid form of (R)-oxybutynin HCl, having an X-Ray powder diffraction pattern comprising at least one peak, at least two peaks, at least three peaks, at least four peaks, at least five peaks, at least six peaks, at least seven peaks, at least eight peaks, at least nine peaks, at least ten peaks, at least eleven peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, 8.7 degrees 2θ±0.2 degree 2θ, 22.2 degrees 2θ±0.2 degree 2θ, and 19.5 degrees 2θ±0.2 degree 2θ, at about ambient relative humidity, e.g., Form C.

Figure 4:
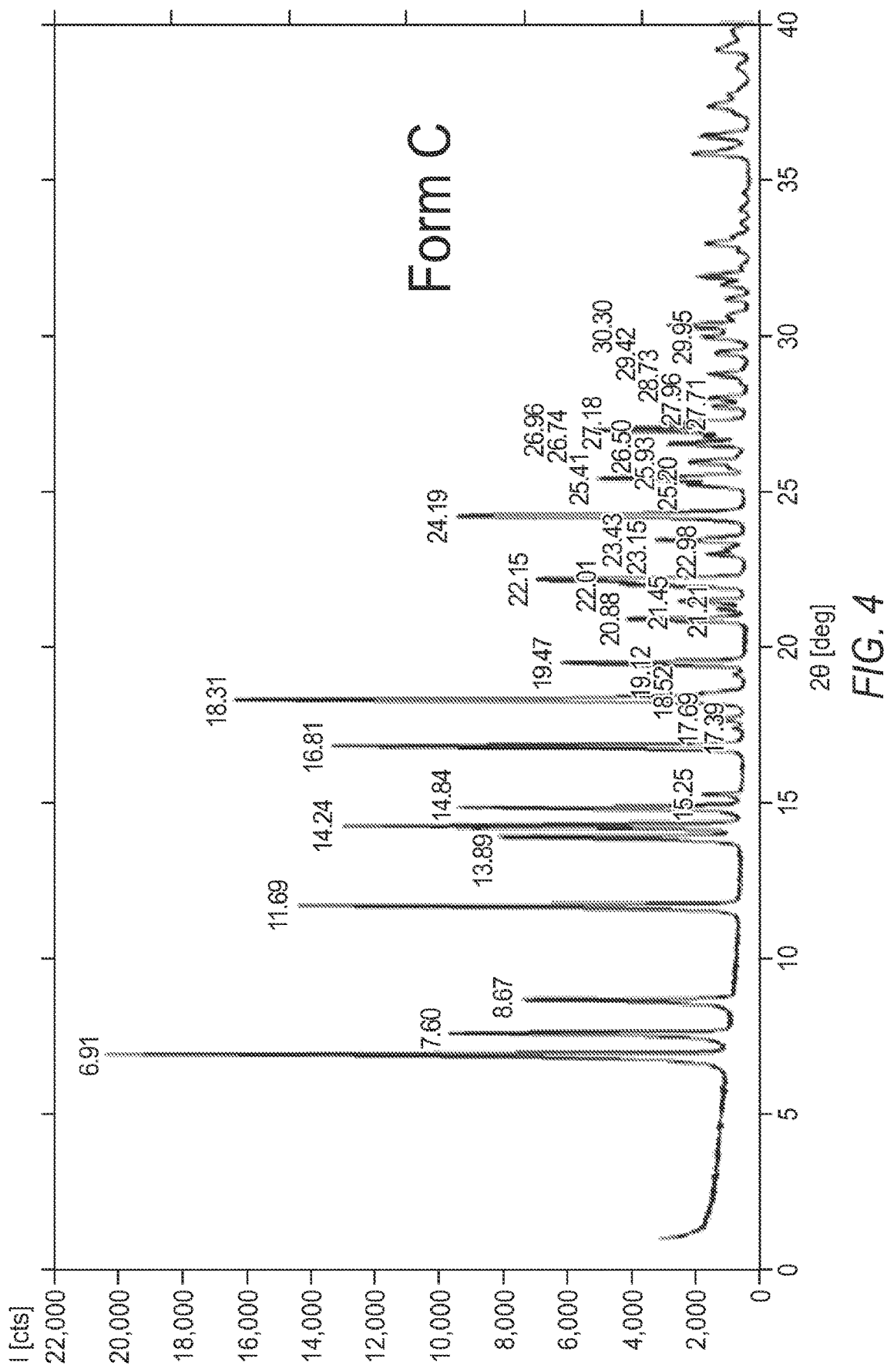
FIG. 4: XRPD pattern of the (R)-oxybutynin HCl Form C polymorph at ambient RH (e.g., 40-65% RH).

Certain embodiments disclosed herein provide a solid form (Form C) having an X-ray powder diffraction pattern substantially as shown in FIG. 4 at about ambient relative humidity.

Certain embodiments disclosed herein provide a solid form of (R)-oxybutynin HCl, having a differential scanning calorimetry (DSC) thermogram displaying a melting onset at 109.6° C. and an endothermic peak at 119.1° C., e.g., Form C. Form C showed a higher melt temperature compared to both Form A and Form B.

Figure 7:
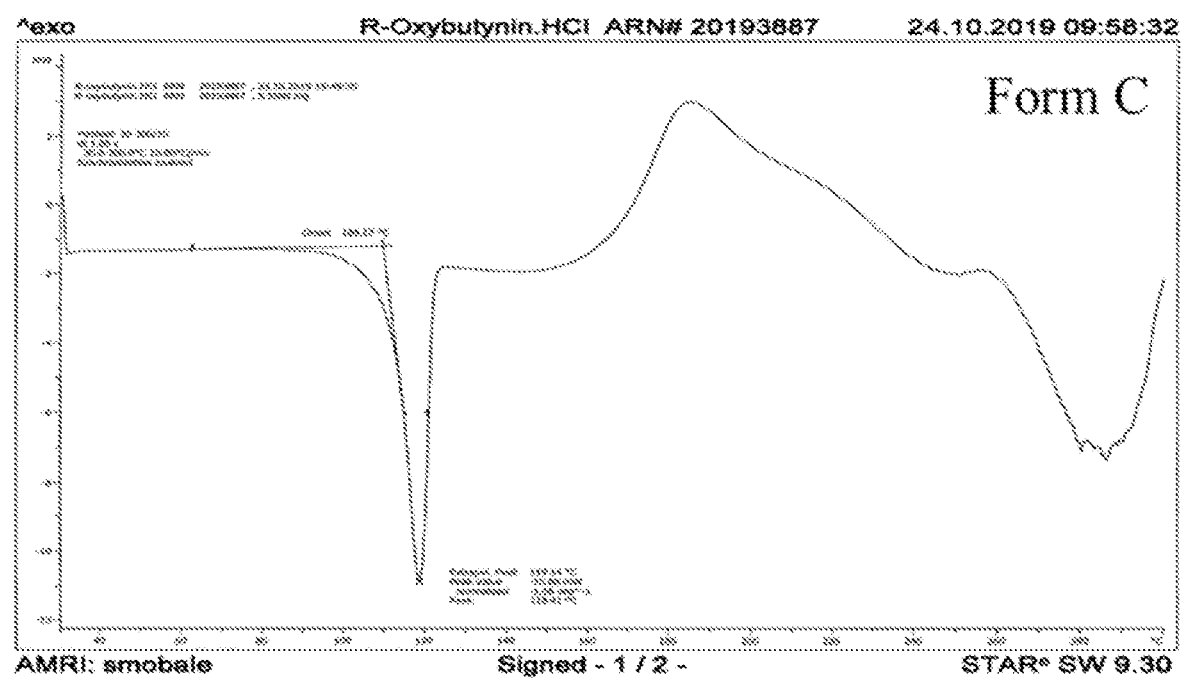
FIG. 7: Thermal analysis of the (R)-oxybutynin HCl Form C polymorph by DSC.

Certain embodiments disclosed herein provide a solid form of (R)-oxybutynin HCl, having a differential scanning calorimetry (DSC) thermogram substantially as shown in FIG. 7, e.g., Form C.

Certain embodiments disclosed herein provide a solid form of (R)-oxybutynin as disclosed herein (e.g., Form C) wherein said solid form comprises at least 1% w/w of a total sample of (R)-oxybutynin HCl. Certain embodiments disclosed herein provide a composition comprising (R)-oxybutynin wherein at least 5% w/w of the total amount of (R)-oxybutynin is a solid form of (R)-oxybutynin as disclosed herein (e.g., Form C). Certain embodiments disclosed herein provide a composition comprising (R)-oxybutynin wherein at least 10% w/w of the total amount of (R)-oxybutynin is a solid form of (R)-oxybutynin as disclosed herein (e.g., Form C). Certain embodiments disclosed herein provide a composition comprising (R)-oxybutynin wherein at least 25% w/w of the total amount of (R)-oxybutynin is a solid form of (R)-oxybutynin as disclosed herein (e.g., Form C). Certain embodiments disclosed herein provide a composition comprising (R)-oxybutynin wherein at least 50% w/w of the total amount of (R)-oxybutynin is a solid form of (R)-oxybutynin as disclosed herein (e.g., Form C). Certain embodiments disclosed herein provide a composition comprising (R)-oxybutynin wherein at least 90% w/w of the total amount of (R)-oxybutynin is a solid form of (R)-oxybutynin as disclosed herein (e.g., Form C). Certain embodiments disclosed herein provide a composition comprising (R)-oxybutynin wherein at least 95% w/w of the total amount of (R)-oxybutynin is a solid form of (R)-oxybutynin as disclosed herein (e.g., Form C). Certain embodiments disclosed herein provide a composition comprising (R)-oxybutynin wherein at least 98% w/w of the total amount of (R)-oxybutynin is a solid form of (R)-oxybutynin as disclosed herein (e.g., Form C). Certain embodiments disclosed herein provide a composition comprising (R)-oxybutynin wherein at least 99% w/w of the total amount of (R)-oxybutynin is a solid form of (R)-oxybutynin as disclosed herein (e.g., Form C).

Certain embodiments disclosed herein provide a pharmaceutical composition comprising Form C in any of its specified embodiments and one or more pharmaceutically acceptable excipients.

Certain embodiments disclosed herein provide a solid form of (R)-oxybutynin HCl having an X-Ray powder diffraction pattern comprising a peak, in terms of 2-theta, at 7.5 degrees 2θ±0.2 degree 2θ at about ambient relative humidity, e.g., Form B.

Certain embodiments disclosed herein provide a solid form of (R)-oxybutynin HCl, having an X-ray powder diffraction pattern comprising a peak, in terms of 2-theta, at 7.5 degrees 2θ±0.2 degree 2θ, and/or 17.2 degrees 2θ±0.2 degree 2θ at about ambient relative humidity, e.g., Form B.

Certain embodiments disclosed herein provide a solid form of (R)-oxybutynin HCl, having an X-ray powder diffraction pattern comprising at least two peaks (e.g., 2 or 3 peaks), in terms of 2-theta, selected from the group consisting of 7.5 degrees 2θ±0.2 degree 2θ, 17.2 degrees 2θ±0.2 degree 2θ, and 14.1 degrees 2θ±0.2 degree 2θ, at about ambient relative humidity, e.g., Form B.

Certain embodiments disclosed herein provide a solid form of (R)-oxybutynin HCl, having an X-ray powder diffraction pattern comprising at least three peaks (e.g., 3, 4, or 5 peaks), in terms of 2-theta, selected from the group consisting of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, and 15.5 degrees 2θ±0.2 degree 2θ, at about ambient relative humidity, e.g., Form B.

Certain embodiments disclosed herein provide a solid form of (R)-oxybutynin HCl, having an X-Ray powder diffraction pattern comprising at least one peak, at least two peaks, at least three peaks, at least four peaks, at least five peaks, at least six peaks, at least seven peaks, at least eight peaks, at least nine peaks, at least ten peaks, at least eleven peaks, in terms of 2-theta, selected from the group consisting of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, 15.5 degrees 2θ±0.2 degree 2θ, 12.9 degrees 2θ±0.2 degree 2θ, 19.3 degrees 2θ±0.2 degree 2θ, 24.4 degrees 2θ±0.2 degree 2θ, 13.7 degrees 2θ±0.2 degree 2θ, 12.4 degrees 2θ±0.2 degree 2θ, 21.4 degrees 2θ±0.2 degree 2θ, 18.1 degrees 2θ±0.2 degree 2θ, 20.1 degrees 2θ±0.2 degree 2θ, 6.6 degrees 2θ±0.2 degree 2θ, 8.2 degrees 2θ±0.2 degree 2θ, and 20.4 degrees 2θ±0.2 degree 2θ, at about ambient relative humidity, e.g., Form B.

Figure 3:
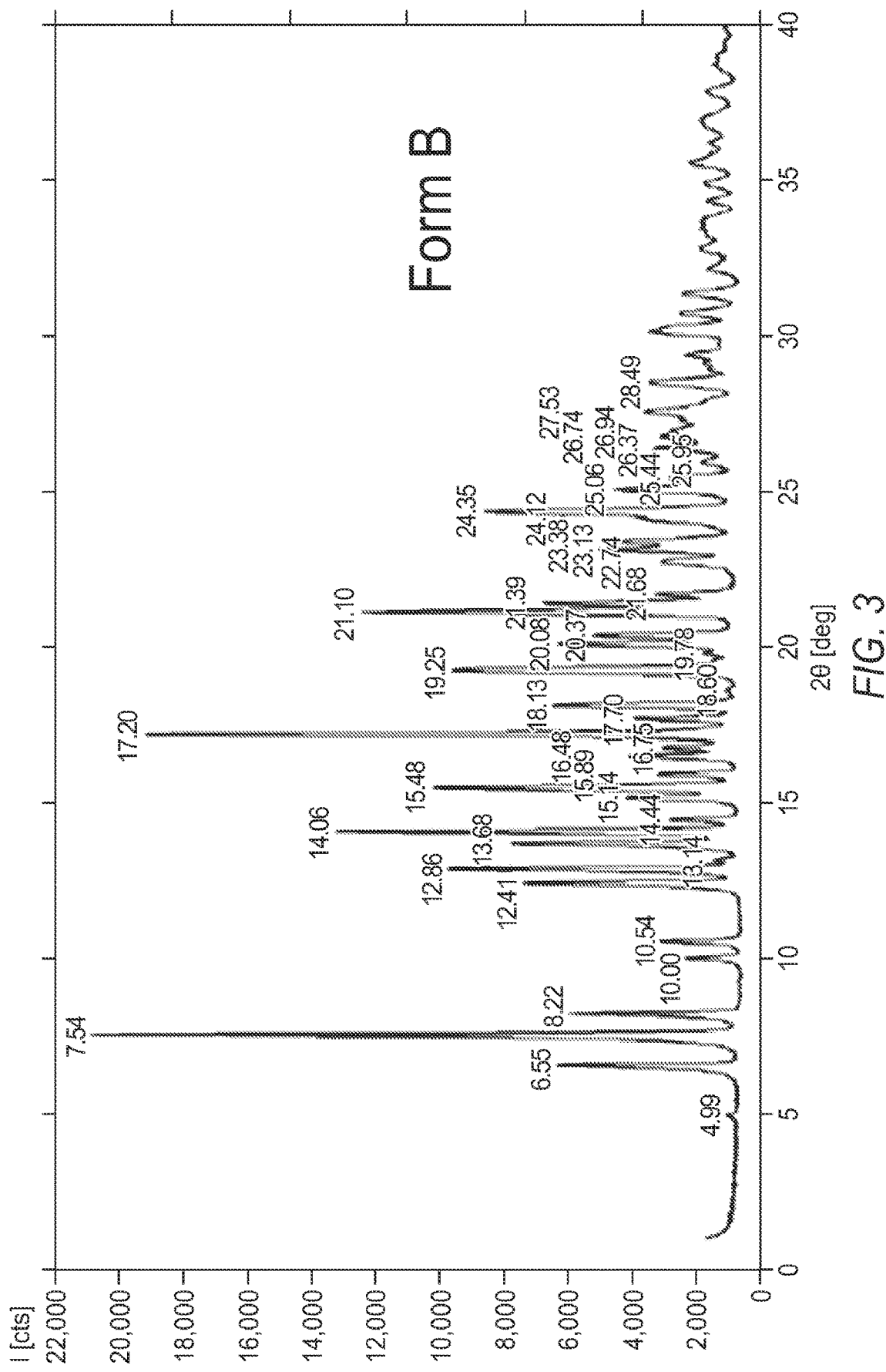
FIG. 3: XRPD pattern of the (R)-oxybutynin HCl Form B polymorph at ambient RH (e.g., 40-65% RH).

Certain embodiments disclosed herein provide a solid form of (R)-oxybutynin HCl, having an X-ray powder diffraction pattern substantially as shown in FIG. 3 at about ambient relative humidity, e.g., Form B.

Certain embodiments disclosed herein provide a solid form of (R)-oxybutynin HCl, having a differential scanning calorimetry (DSC) thermogram displaying a melting onset at about 40° C. and an endothermic peak at 64.8° C., e.g., Form B.

Figure 6:
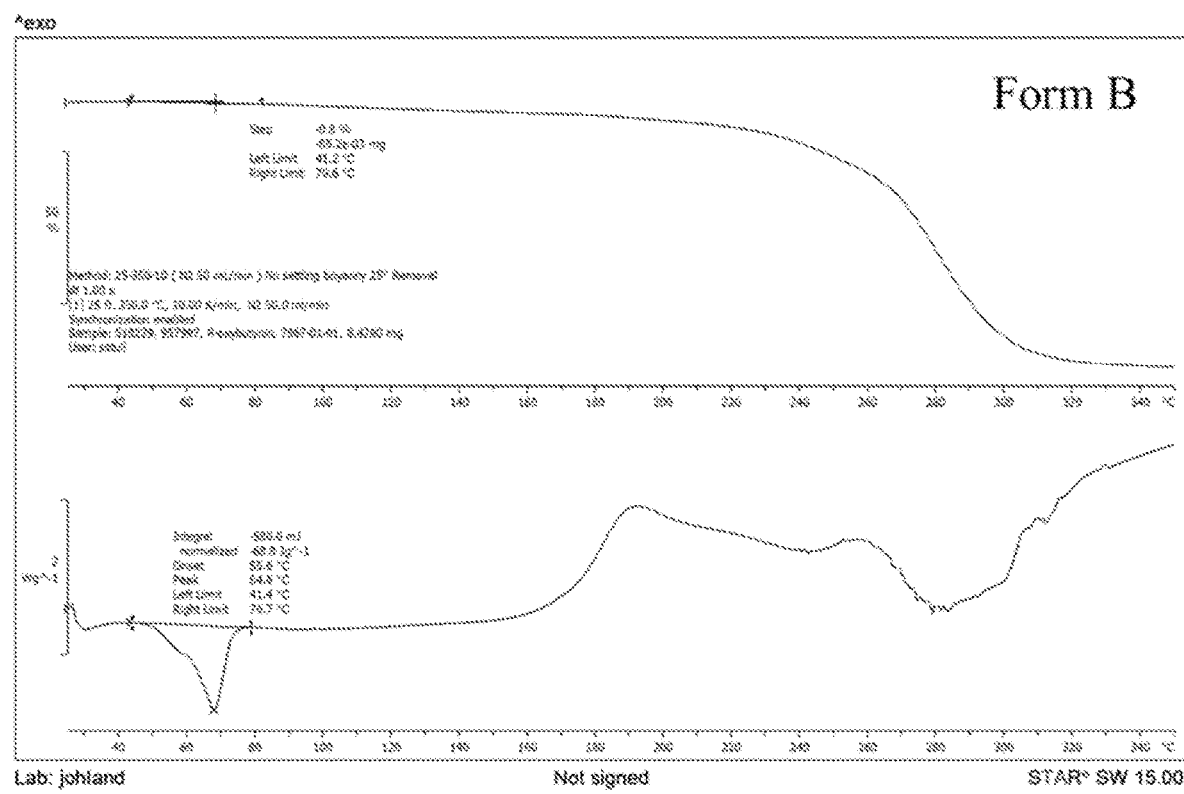
FIG. 6: Thermal analysis of the (R)-oxybutynin HCl Form B polymorph by TGA (top) and DSC (bottom).

Certain embodiments disclosed herein provide a solid form of (R)-oxybutynin HCl, having a differential scanning calorimetry (DSC) thermogram substantially as shown in FIG. 6, e.g., Form B.

Certain embodiments disclosed herein provide a pharmaceutical composition comprising a solid form of (R)-oxybutynin HCl disclosed herein (e.g., Form B), and one or more pharmaceutically acceptable excipients.

In some embodiments, a solid form (R)-oxybutynin HCl is a crystalline mixture comprising less than 1% Form B. In certain embodiments, a solid form (R)-oxybutynin HCl is a crystalline mixture comprising more than 0.1% of Form B but less than 2%. In some embodiments, a solid form (R)-oxybutynin HCl comprises at least 10% Form B. In some embodiments, a solid form (R)-oxybutynin HCl comprises at least 25% Form B. In some embodiments, a solid form (R)-oxybutynin HCl comprises at least 50% Form B. In some embodiments, a solid form (R)-oxybutynin HCl comprises at least 75% Form B. In some embodiments, a solid form (R)-oxybutynin HCl comprises at least 95% Form B. In some embodiments, a solid form (R)-oxybutynin HCl comprises at least 97% Form B. In some embodiments, a solid form (R)-oxybutynin HCl comprises at least 99% Form B.

Certain embodiments disclosed herein provide a solid and solvated (hereinafter "solid solvated") form of (R)-oxybutynin HCl, e.g., Form A. In some embodiments the solid hydrated form of (R)-oxybutynin HCl includes an isopropanol solvate.

Certain embodiments disclosed herein provide a solid solvated form of (R)-oxybutynin HCl having an X-Ray powder diffraction comprising a peak, in terms of 2-theta, at 19.2 degrees 2θ±0.2 degree 2θ at about ambient relative humidity, e.g., Form A.

Certain embodiments disclosed herein provide a solid solvated form of (R)-oxybutynin HCl having an X-ray powder diffraction pattern comprising a peak, in terms of 2-theta, at 19.2 degrees 2θ±0.2 degree 2θ, and/or 6.1 degrees 2θ±0.2 degree 2θ, at about ambient relative humidity, e.g., Form A.

Certain embodiments disclosed herein provide a solid solvated form of (R)-oxybutynin HCl having an X-ray powder diffraction pattern comprising at least two peaks (e.g., 2 or 3 peaks), in terms of 2-theta, selected from the group consisting of 19.2 degrees 2θ±0.2 degree 2θ, 6.1 degrees 2θ±0.2 degree 2θ, and 7.7 degrees 2θ±0.2 degree 2θ, at about ambient relative humidity, e.g., Form A.

Certain embodiments disclosed herein provide a solid solvated form of (R)-oxybutynin HCl having an X-Ray powder diffraction pattern comprising at least three peaks (e.g., 3, 4 or 5 peaks), in terms of 2-theta, selected from the group consisting of 19.2 degrees 2θ±0.2 degree 2θ, 6.1 degrees 2θ±0.2 degree 2θ, 7.7 degrees 2θ±0.2 degree 2θ, 12.9 degrees 2θ±0.2 degree 2θ, and 21.6 degrees 2θ±0.2 degree 2θ, at about ambient relative humidity, e.g., Form A.

Certain embodiments disclosed herein provide a solid solvated form of (R)-oxybutynin HCl having an X-Ray powder diffraction pattern comprising at least four peaks (e.g., 4 or 5 peaks), in terms of 2-theta, selected from the group consisting of 19.2 degrees 2θ±0.2 degree 2θ, 6.1 degrees 2θ±0.2 degree 2θ, 7.7 degrees 2θ±0.2 degree 2θ, 12.9 degrees 2θ±0.2 degree 2θ, and 21.6 degrees 2θ±0.2 degree 2θ, at about ambient relative humidity, e.g., Form A.

Certain embodiments disclosed herein provide a solid solvated form of (R)-oxybutynin HCl having an X-Ray powder diffraction pattern comprising at least one peak, at least two peaks, at least three peaks, at least four peaks, at least five peaks, at least six peaks, at least seven peaks, at least eight peaks, at least nine peaks, at least ten peaks, or at least eleven peaks, in terms of 2-theta, selected from the group consisting of 19.2 degrees 2θ±0.2 degree 2θ, 6.1 degrees 2θ±0.2 degree 2θ, 7.7 degrees 2θ±0.2 degree 2θ, 12.9 degrees 2θ±0.2 degree 2θ, 21.6 degrees 2θ±0.2 degree 2θ, 18.3 degrees 2θ±0.2 degree 2θ, 15.5 degrees 2θ±0.2 degree 2θ, 22.8 degrees 2θ±0.2 degree 2θ, 16.7 degrees 2θ±0.2 degree 2θ, 17.6 degrees 2θ±0.2 degree 2θ, 19.5 degrees 2θ±0.2 degree 2θ, 14.6 degrees 2θ±0.2 degree 2θ, and 20.8 degrees 2θ±0.2 degree 2θ, at about ambient relative humidity, e.g., Form A.

Figure 2:
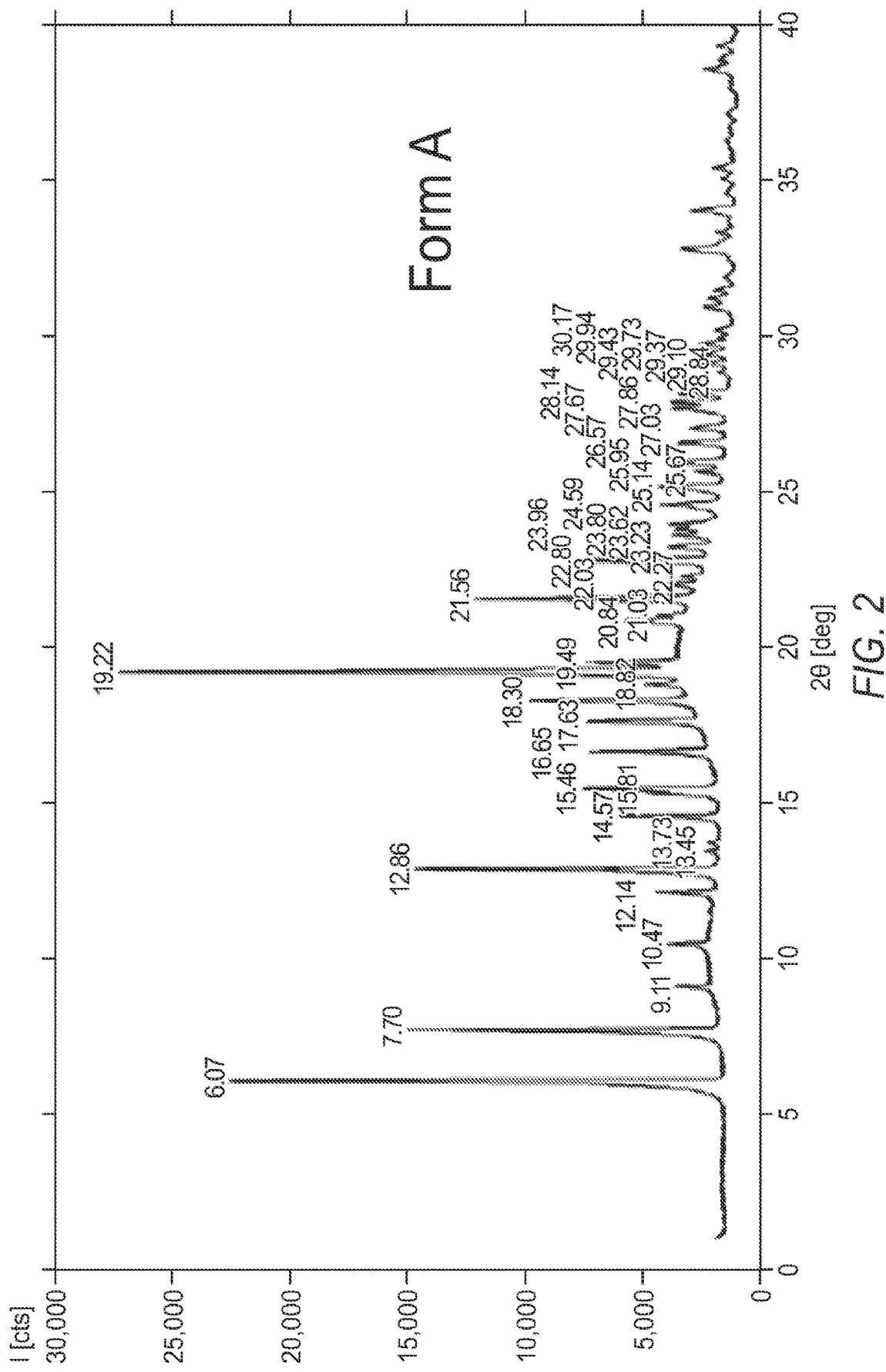
FIG. 2: XRPD pattern of the (R)-oxybutynin HCl Form A polymorph at ambient RH (e.g., 40-65% RH).

Certain embodiments disclosed herein provide a solid form of (R)-oxybutynin HCl, having an X-ray powder diffraction pattern substantially as shown in FIG. 2 at about ambient relative humidity, e.g., Form A.

Certain embodiments disclosed herein provide a solid form of (R)-oxybutynin HCl, having a differential scanning calorimetry (DSC) thermogram displaying broad endotherm transitions with an initial endothermic peak at 70.2° C., with additional endothermic peaks at 87.9° C. and 119.4° C. e.g., Form A. The sample exhibits a weight loss of 28% between 29° C. and 158° C.

Figure 5:
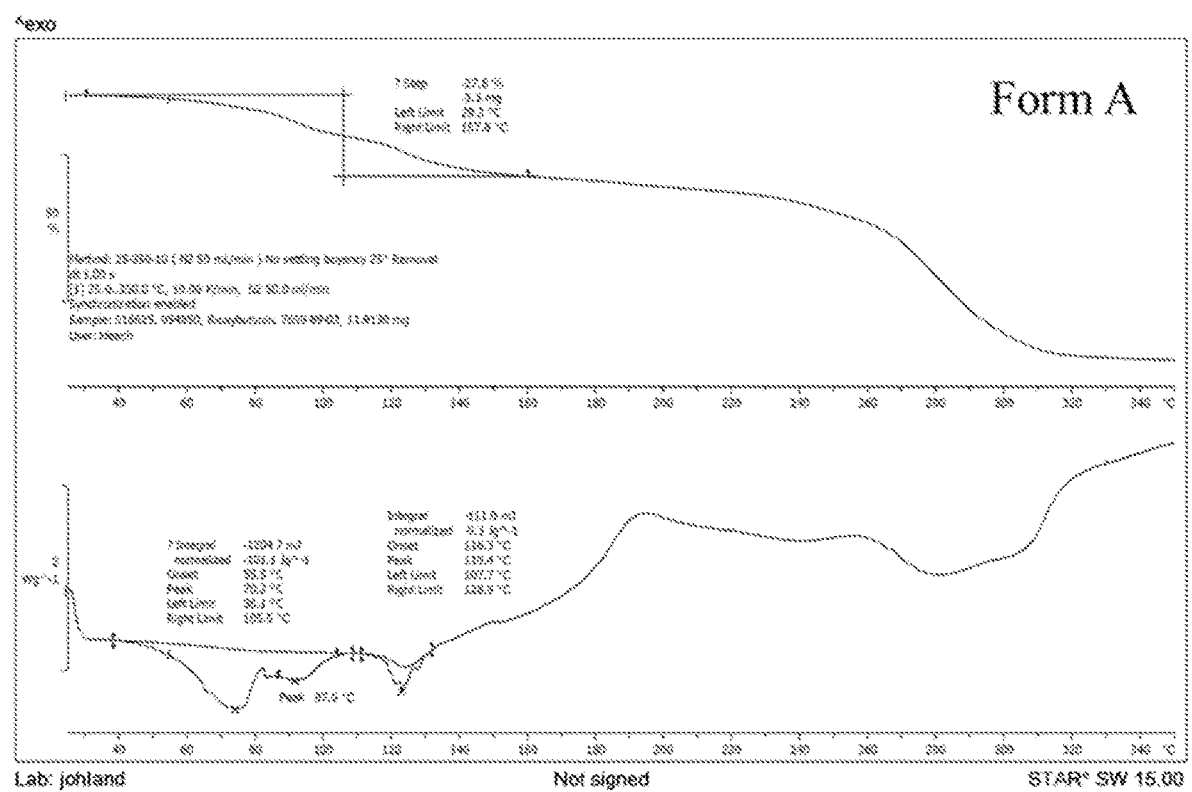
FIG. 5: Thermal analysis of the (R)-oxybutynin HCl Form A polymorph by TGA (top) and DSC (bottom).

Certain embodiments disclosed herein provide a solid form of (R)-oxybutynin HCl, having a differential scanning calorimetry (DSC) thermogram substantially as shown in FIG. 5, e.g., Form A.

Certain embodiments disclosed herein provide a solid form of (R)-oxybutynin HCl that is amorphous.

Certain embodiments disclosed herein provide one or more crystalline and/or amorphous forms of (R)-oxybutynin HCl dispersed into a matrix.

Certain embodiments are disclosed comprising a dosage form of (R)-oxybutynin HCl comprising from about 0.1 to about 25 mg, from about 0.1 to about 15 mg, from about 0.1 to about 10 mg, from about 1 to about 25 mg, from about 1 to about 20 mg, from about 1 to about 15 mg, from about 1 to about 10 mg, from about 1 to about 5 mg, from about 2 to about 25 mg, from about 2 to about 20 mg, from about 2 to about 15 mg, from about 2 to about 10 mg, from about 2 to about 5 mg, from about 5 to about 25 mg, from about 5 to about 20 mg, from about 5 to about 15 mg, or from about 5 to about 10 mg of (R)-oxybutynin HCl in one or more crystalline (e.g., Form A, B, and C) and/or amorphous forms, wherein said one or more crystalline and/or amorphous forms are dispersed in a solid or liquid matrix II. Pharmaceutical compositions and/or formulas of Polymorphic Forms of (R)-Oxybutynin HCl Provided herein are pharmaceutical compositions comprising one or more polymorphous forms of (R)-oxybutynin HCl, and a physiologically acceptable carrier (also referred to as a pharmaceutically acceptable carrier or solution or diluent). Such carriers and solutions include pharmaceutically acceptable salts and solvates of compounds used in the methods of the instant invention, and mixtures comprising two or more of such compounds, pharmaceutically acceptable salts of the compounds and pharmaceutically acceptable solvates of the compounds. Such compositions are prepared in accordance with acceptable pharmaceutical procedures such as described in Remington's Pharmaceutical Sciences, 17th edition, ed. Alfonso R. Gennaro, Mack Publishing Company, Eaton, Pa. (1985), which is incorporated herein by reference.

The term "pharmaceutically acceptable carrier" refers to a carrier that does not cause an allergic reaction or other untoward effect in a subject to whom it is administered and are compatible with the other ingredients in the formulation. Pharmaceutically acceptable carriers include, for example, pharmaceutical diluents, excipients or carriers suitably selected with respect to the intended form of administration, and consistent with conventional pharmaceutical practices. For example, solid carriers/diluents include, but are not limited to, a gum, a starch (e.g., corn starch, pregelatinized starch), a sugar (e.g., lactose, mannitol, sucrose, dextrose), a cellulosic material (e.g., microcrystalline cellulose), an acrylate (e.g., polymethylacrylate), calcium carbonate, magnesium oxide, talc, or mixtures thereof. Pharmaceutically acceptable carriers may further comprise minor amounts of auxiliary substances such as wetting or emulsifying agents, preservatives or buffers, which enhance the shelf life or effectiveness of the therapeutic agent.

The one or more polymorphous and/or amorphous forms of (R)-oxybutynin HCl disclosed herein and pharmaceutical compositions thereof may be formulated into unit dosage forms, meaning physically discrete units suitable as unitary dosage for subjects undergoing treatment, with each unit containing a predetermined quantity of active material calculated to produce the desired therapeutic effect, optionally in association with a suitable pharmaceutical carrier. The unit dosage form can be for a single daily dose or one of multiple daily doses (e.g., about 1 to 4 or more times per day). When multiple daily doses are used, the unit dosage form can be the same or different for each dose. In certain embodiments, the compounds may be formulated for controlled release.

The one or more polymorphous and/or amorphous forms of (R)-oxybutynin HCl disclosed herein and pharmaceutical compositions thereof may be formulated according to any available conventional method. In the formulation, generally used additives such as a diluent, a binder, an disintegrant, a lubricant, a colorant, a flavoring agent, and if necessary, a stabilizer, an emulsifier, an absorption enhancer, a surfactant, a pH adjuster, an antiseptic, an antioxidant and the like can be used. For the purpose of oral therapeutic administration, the active compound(s) can be incorporated with excipients and used in the form of pills, tablets, troches, or capsules, e.g., gelatin capsules. Oral compositions can also be prepared using a fluid carrier. Pharmaceutically compatible binding agents, and/or adjuvant materials can be included as part of the composition. Dosage forms including a tablet, a powder, a subtle granule, a granule, a coated tablet, a capsule, a syrup, a troche, and the like can contain any of the following ingredients, or compounds of a similar nature: a binder such as microcrystalline cellulose, gum tragacanth or gelatin; an excipient such as starch or lactose, a disintegrating agent such as alginic acid, Primogel, crospovidone or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring.

Systemic administration of one or both of the compounds as described herein (i.e., one or both of a norepinephrine reuptake inhibitor and substantially enantiomerically pure (R)-oxybutynin) can also be by transdermal means, e.g., using a patch, gel, or lotion, to be applied to the skin. For transdermal administration, penetrants appropriate to the permeation of the epidermal barrier can be used in the formulation. Such penetrants are generally known in the art. For example, for transdermal administration, the active compounds can formulated into ointments, salves, gels, or creams as generally known in the art. The gel and/or lotion can be provided in individual sachets, or via a metered-dose pump that is applied daily; see, e.g., Cohn et al., Ther Adv Urol. 2016 April; 8 (2): 83-90.

In some embodiments, the therapeutic compounds are prepared with carriers that will protect the therapeutic compounds against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Such formulations can be prepared using standard techniques, or obtained commercially, e.g., from Alza Corporation and Nova Pharmaceuticals, Inc. Liposomal suspensions can also be used as pharmaceutically acceptable carriers. These can be prepared according to methods known to those skilled in the art, for example, as described in U.S. Pat. No. 4,522,811.

The pharmaceutical compositions can be included in a container, pack, or dispenser together with instructions for administration or use in a method described herein.

Some embodiments disclosed herein provide a pharmaceutical dosage form comprising (R)-oxybutynin HCl Form C in an amount of about 0.1 mg, about 0.5 mg, about 0.75 mg, about 1 mg, about 2.5 mg, about 5 mg, about 7.5 mg, about 10 mg, about 12.5 mg, about 15 mg, about 17.5 mg, about 20 mg, about 22.5 mg, or about 25 mg.

Certain embodiments disclosed herein provide a drug dosage form as a tablet comprising about 0.1 mg, about 0.5 mg, about 0.75 mg, about 1 mg, about 2.5 mg, about 5 mg, about 7.5 mg, about 10 mg, about 12.5 mg, about 15 mg, about 17.5 mg, about 20 mg, about 22.5 mg, or about 25 mg of (R)-oxybutynin HCl crystalline Form C. In certain embodiments, at least 80%, at least 85%, at least 90%, at least 95%, at least 98%, or at least 99.5% of the (R)-oxybutynin in the tablet is (R)-oxybutynin HCl crystalline Form C.

Certain embodiments disclosed herein provide a pharmaceutical composition comprising about 0.1 mg, about 0.5 mg, about 0.75 mg, about 1 mg, about 2.5 mg, about 5 mg, about 7.5 mg, about 10 mg, about 12.5 mg, about 15 mg, about 17.5 mg, about 20 mg, about 22.5 mg, or about 25 mg of a solid form of (R)-oxybutynin HCl disclosed herein (e.g., comprising Form B and/or Form C), and one or more pharmaceutically acceptable excipients.

In certain embodiments, a pharmaceutical dosage form comprises Form C as disclosed herein.

Certain embodiments disclosed herein comprise (R)-oxybutynin HCl Form C or pharmaceutical compositions thereof substantially free of other crystalline or amorphous forms. For example, in some embodiments, the (R)-oxybutynin HCl Form C or pharmaceutical composition thereof comprises 90%, 91%, 92%, 93%, 94%, 95%, 96%, 97%, 98%, 99%, 99.5%, 99.9% by weight of Form C relative to other crystalline or amorphous forms of (R)-oxybutynin HCl.

III. Use of the Polymorphic Forms of (R)-Oxybutynin HCl

Provided herein in some embodiments are methods of treating a subject having a condition associated with pharyngeal airway collapse, the method comprising administering to a subject in need thereof an effective amount of (i) a norepinephrine reuptake inhibitor (NRI) (e.g., atomoxetine or a pharmaceutically acceptable salt thereof) and (ii) substantially enantiomerically pure (R)-oxybutynin HCl. The methods comprise administering to the subject a therapeutically effective amount of one or more polymorphic forms of (R)-oxybutynin HCl disclosed herein, or a pharmaceutical composition thereof. In some embodiments, the substantially enantiomerically pure (R)-oxybutynin HCl is Form C.

Provided herein in other embodiments are methods of treating a subject having a condition associated with pharyngeal airway collapse, the method comprising administering to a subject in need thereof an effective amount of (i) 4-hydroxyatomoxetine or a pharmaceutically acceptable salt thereof; and (ii) substantially enantiomerically pure (R)-oxybutynin HCl. The methods comprise administering to the subject a therapeutically effective amount of one or more polymorphic forms of (R)-oxybutynin HCl disclosed herein, or a pharmaceutical composition thereof. In some embodiments, the substantially enantiomerically pure (R)-oxybutynin HCl is Form C.

In other embodiments, provided herein are methods of treating a subject having a condition associated with pharyngeal airway collapse comprising administering to a subject in need thereof an effective amount of (i) 4-hydroxyatomoxetine or a pharmaceutically acceptable salt thereof; (ii) substantially enantiomerically pure (R)-oxybutynin HCl, and (iii) a hypnotic. The method comprises administering to the subject a therapeutically effective amount of one or more polymorphic forms of (R)-oxybutynin HCl disclosed herein, or a pharmaceutical composition thereof. In some embodiments, the substantially enantiomerically pure (R)-oxybutynin HCl is Form C.

In still other embodiments, provided herein are methods of treating a subject having a condition associated with pharyngeal airway collapse comprising administering to a subject in need thereof an effective amount of a pharmaceutical composition comprising a norepinephrine reuptake inhibitor (e.g., atomoxetine or a pharmaceutically acceptable salt thereof), substantially enantiomerically pure (R)-oxybutynin HCl, and a carbonic anhydrase inhibitor as active ingredients. These norepinephrine reuptake inhibitor, (R)-oxybutynin HCl, and carbonic anhydrase inhibitor agents can be administered in a single composition or in separate compositions. The method comprises administering to the subject a therapeutically effective amount of one or more polymorphic forms of (R)-oxybutynin HCl disclosed herein with the norepinephrine reuptake inhibitor and carbonic anhydrase inhibitor. In some embodiments, the (R)-oxybutynin HCl is administered as Form C.

Exemplary norepinephrine reuptake inhibitors (NRIs) include the selective NRIs Amedalin (UK-3540-1), Atomoxetine (Strattera), CP-39,332, Daledalin (UK-3557-15), Edivoxetine (LY-2216684), Esreboxetine, Lortalamine (LM-1404), Nisoxetine (LY-94,939), Reboxetine (Edronax, Vestra), Talopram (Lu 3-010), Talsupram (Lu 5-005), Tandamine (AY-23,946), Viloxazine (Vivalan); non-selective NRIs include Amitriptiline, Amoxapine, Bupropion, Ciclazindol, Desipramine, Desvenlafaxine, Dexmethilphenidate, Diethylpropion, Doxepin, Duloxetine, Imipramine, Levomilnacipran, Manifaxine (GW-320,659), Maprotiline, Methylphenidate, Milnacipran, Nefazodone, Nortriptyline, Phendimetrazine, Phenmetrazine, Protryptyline, Radafaxine (GW-353,162), Tapentadol (Nucynta), Teniloxazine (Lucelan, Metatone) and Venlafaxine and pharmaceutically acceptable salts thereof.

In some embodiments, the norepinephrine reuptake inhibitor is Atomoxetine or a pharmaceutically acceptable salt thereof. In other embodiments, the norepinephrine reuptake inhibitor is Reboxetine or a pharmaceutically acceptable salt thereof. In still other embodiments, the norepinephrine reuptake inhibitor is a combination of Atomoxetine and Reboxetine or pharmaceutically acceptable salts thereof.

Oxybutynin is an antimuscarinic drug and a muscarinic receptor antagonist. In some embodiments, the oxybutynin is a racemic mixture of (R)-oxybutynin and(S)-oxybutynin. In some embodiments, the salt form or composition comprises a mixture of oxybutynin enantiomers, as described herein, where there is an enantiomeric excess of (R)-oxybutynin relative to its enantiomeric pair (i.e., (S)-oxybutynin). The enantiomeric excess of (R)-oxybutynin in these mixtures may be ≥10%, >20%, >25%, ≥30%, ≥40%, ≥50%, ≥60%, ≥70%, ≥75%, ≥80%, or ≥90%.

In some embodiments, the muscarinic receptor antagonist is a substantially enantiomerically pure (R)-oxybutynin. In some embodiments, the substantially enantiomerically pure (R)-oxybutynin, referred to herein as "(R)-oxybutynin" and/or salts thereof, are better tolerated over long term use in subjects than the racemic oxybutynin forms. A composition comprising substantially enantiomerically pure (R)-oxybutynin, as described herein with various polymorphs, may have an enantiomeric excess of the substantially enantiomerically pure (R)-oxybutynin of >80%, ≥90%, ≥95%, ≥98%, >99%, ≥99.5%, ≥99.8% or ≥99.9%.

The carbonic anhydrase inhibitor may be selected from the group consisting of acetazolamide, dichlorophenamide, dorzolamide, brinzolamide, methazolamide, zonisamide, ethoxzolamide, topiramate, sultiame, and any combinations thereof or pharmaceutically acceptable salts thereof. In some embodiments, the carbonic anhydrase inhibitor is acetazolamide or a pharmaceutically acceptable salt thereof.

In some embodiments, hypnotics may be incorporated into the compositions, e.g., zolpidem, zopiclone, eszopiclone, trazodone, zaleplon, benzodiazepines, gabapentin, tiagabine, and xyrem or pharmaceutically acceptable salts thereof. In some embodiments, patients having OSA have a low arousal threshold, which can be exacerbated by atomoxetine and/or 4-hydroxyatomextine. In such embodiments where patients have a low arousal threshold caused or worsened by the use of atomoxetine and/or 4-hydroxyatomextine, a hypnotic can be used as a supplementary active compound to increase the arousal threshold of the patient having OSA, pharyngeal airway collapse, or a combination thereof. In some embodiments, the arousal threshold of a patient can be measured by polysomnography (PSG). In some embodiments, a patient is a human subject.

In some embodiments, the methods include administering a dose of from about 20 mg to about 150 mg atomoxetine or a pharmaceutically acceptable salt thereof (or a dose equivalent thereof of another NRI), from about 20 mg to about 100 mg atomoxetine or a pharmaceutically acceptable salt thereof, from about 50 mg to about 100 mg atomoxetine or a pharmaceutically acceptable salt thereof, or from about 75 mg to about 100 mg atomoxetine or a pharmaceutically acceptable salt thereof. In some embodiments, the methods include administering a dose of from about 0.1 mg to about 25 mg (R)-oxybutynin HCl, from about 1 mg to about 20 mg (R)-oxybutynin HCl, from about 1 mg to about 10 mg (R)-oxybutynin HCl, or from about 2.5 mg to about 7.5 mg (R)-oxybutynin HCl. In other embodiments, the methods include administering a dose of from about 20 mg to about 150 mg atomoxetine or a pharmaceutically acceptable salt thereof (or a dose equivalent thereof of another NRI) in combination with about 0.1 mg to about 25 mg (R)-oxybutynin HCl, from about 20 mg to about 150 mg atomoxetine or a pharmaceutically acceptable salt thereof in combination with about 1 mg to about 20 mg (R)-oxybutynin HCl, from about 20 mg to about 150 mg atomoxetine or a pharmaceutically acceptable salt thereof in combination with about 1 mg to about 10 mg (R)-oxybutynin HCl, or from about 20 mg to about 150 mg atomoxetine or a pharmaceutically acceptable salt thereof in combination with about 2.5 mg to about 7.5 mg (R)-oxybutynin HCl. In some embodiments, the (R)-oxybutynin HCl may be formulated and applied as an active coating for the NRI or atomoxetine. In other embodiments, the (R)-oxybutynin HCl may be formulated as a blend with the NRI or atomoxetine.

In some embodiments, the methods include administering a dose of 20-100 mg atomoxetine and/or 4-hydroxyatomoxetine or pharmaceutically acceptable salts thereof, a dose of 2-15 mg oxybutynin (i.e., muscarinic receptor antagonist), and a dose of 0.5-15 mg zolpidem (or a dose equivalent thereof of another hypnotic). In some embodiments, the methods include administering 75 mg atomoxetine and/or 4-hydroxyatomoxetine/6 mg (R)-oxybutynin/ 10 mg zolpidem; 75 mg atomoxetine and/or 4-hydroxyatomoxetine/5 mg oxybutynin/10 mg zolpidem; 75 mg atomoxetine and/or 4-hydroxyatomoxetine/4.5 mg oxybutynin/5 mg zolpidem; 50 mg atomoxetine and/or 4-hydroxyatomoxetine/4 mg oxybutynin/3.5 mg zolpidem; or 25 mg atomoxetine and/or 4-hydroxyatomoxetine/3 mg oxybutynin/1.75 mg zolpidem, e.g., 15-60, 15-25, 20-30, or 20-45 minutes before sleep time. In some embodiments, the hypnotic is present in an amount of from about 0.5 to about 15 mg, from about 0.5 to about 10 mg, from about 0.5 to about 5 mg, from about 0.5 to about 3.5 mg, or from about 0.5 to about 1.75 mg.

In some embodiments, the methods include administering a dose of from about 20 mg to about 150 mg atomoxetine or a pharmaceutically acceptable salt thereof (or a dose equivalent thereof of another NRI), from about 20 mg to about 100 mg atomoxetine or a pharmaceutically acceptable salt thereof, from about 50 mg to about 100 mg atomoxetine or a pharmaceutically acceptable salt thereof, or from about 75 mg to about 100 mg atomoxetine or a pharmaceutically acceptable salt thereof. In some embodiments, the methods include administering a dose of from about 0.1 mg to about 25 mg (R)-oxybutynin HCl, from about 1 mg to about 20 mg (R)-oxybutynin HCl, from about 1 mg to about 10 mg (R)-oxybutynin HCl, or from about 2.5 mg to about 7.5 mg (R)-oxybutynin HCl. In some embodiments, the methods include administering a dose of from about 50 mg to about 1000 mg acetazolamide (or a dose equivalent thereof of another CAI), from about 100 mg to about 800 mg acetazolamide, from about 250 mg to about 750 mg acetazolamide, from about 500 mg to about 750 mg acetazolamide, or from about 450 mg to about 650 mg acetazolamide. In some embodiments, the methods include administering a dose of from about 20 mg to about 150 mg NRI, from about 1 mg to about 25 mg MRA comprising (R)-oxybutynin, and from about 250 mg to about 750 mg carbonic anhydrase inhibitor. In other embodiments, the methods include administering from about 50 mg to about 100 mg NRI, from about 1 mg to about 15 mg MRA comprising (R)-oxybutynin, and from about 250 mg to about 750 mg carbonic anhydrase inhibitor. In still other embodiments, the methods include administering either combined or separate dosages of 80 mg atomoxetine/5 mg (R)-oxybutynin/500 mg acetazolamide; 80 mg atomoxetine/5 mg oxybutynin/500 mg acetazolamide; 100 mg atomoxetine/5 mg (R)-oxybutynin/500 mg acetazolamide; 100 mg atomoxetine/5 mg (R)-oxybutynin/ 750 mg acetazolamide; or 80 mg atomoxetine/5 mg (R)-oxybutynin/750 mg acetazolamide, e.g., 15-60, e.g., 15-25, 20-30, or 20-45 minutes before sleep time.

An effective amount can be administered in one or more administrations, applications or dosages. The compositions can be administered from one or more times per day to one or more times per week; including once every other day. In some embodiments, the compositions are administered daily. The skilled artisan will appreciate that certain factors may influence the dosage and timing required to effectively treat a subject, including but not limited to the severity of the disease or disorder, previous treatments, the general health and/or age of the subject, and other diseases present. Moreover, treatment of a subject with a therapeutically effective amount of the therapeutic compounds described herein can include a single treatment or a series of treatments.

Dosage, toxicity and therapeutic efficacy of the therapeutic compounds (i.e., NRI, MRA, hypnotics, and CAI, in a single composition or in separate compositions) can be determined by standard pharmaceutical procedures in cell cultures or experimental animals, e.g., for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50.

The data obtained from cell culture assays and animal studies can be used in formulating a range of dosage for use in humans. The dosage of such compounds lies preferably within a range of circulating concentrations that include the ED50 with little or no toxicity. The dosage may vary within this range depending upon the dosage form employed and the route of administration utilized. For any compound used in the method of the invention, the therapeutically effective dose can be estimated initially from cell culture assays. A dose may be formulated in animal models to achieve a circulating plasma concentration range that includes the IC50 (i.e., the concentration of the test compound which achieves a half-maximal inhibition of symptoms) as determined in cell culture. Such information can be used to more accurately determine useful doses in humans. Levels in plasma can be measured, for example, by high performance liquid chromatography.

IV. Preparation and Characterization of the Polymorphic Forms of (R)-Oxybutynin HCl Provided herein are methods for preparing crystalline polymorphic Forms A, B, and C of (R)-oxybutynin HCl. R-oxybutynin HCl Form A is a mono HCl salt of R-oxybutynin that is solvated/hydrated that can be converted to R-oxybutynin HCl Form B upon drying under vacuum at RT and upon storage at ambient conditions. The R-oxybutynin HCl Form C is obtained as a single crystalline phase that competes with the formation of Form B under certain solvent and preparation conditions such as slurries of R-oxybutynin HCl in heptane or MIBK at RT over various periods of time.

Form A

In some embodiments, crystalline R-oxybutynin HCl Form A can be prepared by directly adding excess 1.25 M HCl in IPA to R-oxybutynin. The resulting golden solution can be stirred at RT to produce a thick white paste. Damp solids can be isolated and analyzed from the thick white paste. FIG. 2 provides the XRPD pattern and the corresponding peaks are provided in Table 1 below indicating the R-oxybutynin HCl Form A material is composed primarily or exclusively of a single crystalline phase. The indexed volume (1312.8 Å3/cell) indicates the sample is likely solvated/hydrated based on considerations of molecular volume.

To a solution of (R)-oxybutynin freebase (10 g, 28 mmoles, 1.00 eq) in isopropanol (100 mL, 10 vol.) was added HCl in isopropanol (21.3 mL, 26.6 mmoles, 0.95 eq) over 5 minutes at 25° C. The resulting solution was aged for an hour prior to cooling the batch to 0° C. and aging for 30 minutes (3×2 vol.). The resulting thick white slurry was filtered under nitrogen and washed with isopropanol (3×20 mL). The hygroscopic solids (see FIG. 2) were dried in a vacuum oven at 20-25° C. for 24 h to obtain 9.8 g of (R)-oxybutynin hydrochloride (yield of 78%, retaining 11.5 wt % isopropanol, 0.5 wt % diethylamine).

The $^1$H NMR spectrum is consistent with the structure of R-oxybutynin and contains 0.3 mole IPA based on the presence of peaks at 4.1 ppm and 3.7 ppm. Water, based on the peak at 3.3 ppm, is also observed. Additional trace peaks were observed in the $^1$H NMR spectrum for the solubilized R-oxybutynin HCl Form A material.

The R-oxybutynin HCl Form A material was analyzed by ion chromatography (IC) to determine the chloride content. IC analysis confirms the presence of the chloride ion in an approximate 1:1 API:Cl-molar ratio suggesting a mono chloride salt of R-oxybutynin.

Thermal analysis of the R-oxybutynin HCl Form A material is provided in FIG. 5. Broad endotherms with peak maxima at 70.2° C., 87.9° C. and 119.4° C. are observed in the DSC data, and are associated with a continuous weight loss in the TGA thermogram. The sample exhibits a weight loss of 28% between 29° C. and 158° C.

The R-oxybutynin HCl Form A polymorph was prepared on a ~2 g scale. A subsample of the scaled-up R-oxybutynin HCl Form A was dried under vacuum at RT for 24 hours and resulted in a unique crystalline material designated R-oxybutynin HCl Form B. R-oxybutynin HCl Form B is discussed further below.

Form B

In some embodiments, R-oxybutynin HCl Form B can be prepared by drying R-oxybutynin HCl Form A under vacuum at RT for 24 hours or after storage at ambient conditions. The XRPD pattern of R-oxybutynin HCl Form B is provided in FIG. 3 indicating the Form B material is composed primarily or exclusively of a single crystalline phase. The indexed volume (4705.2 Å3/cell) indicates the sample is likely anhydrous based on considerations of molecular volume. The characterization data and method of preparation suggest R-oxybutynin HCl Form B is an anhydrous/unsolvated mono HCl salt of R-oxybutynin.

$^1$H NMR analysis indicates that the material is consistent with the structure of the API. Water is present in the spectrum at 3.3 ppm, however this may be attributable to latent water in the deuterated solvent.

A single broad endotherm at 64.8° C. (peak max) is observed in the DSC thermogram (FIG. 6) attributable to melting based on hot stage microscopy. No significant weight loss is observed upon heating up to the melt.

IC analysis confirms the presence of the chloride ion in an approximate 1:1 API:Cl-molar ratio suggesting a mono chloride salt of R-oxybutynin.

DVS analysis of R-oxybutynin HCl Form B indicates the material is hygroscopic, the sample showed a 26.6% weight gain from 5% RH to 95% RH. The majority of the weight gain occurred between 75% and 95% RH (23% weight gain). All the weight gained was lost upon desorption from 95% to 5% RH. XRPD analysis of the post-DVS sample indicated that the Form B remained suggesting no physical form changed had occurred. Samples of R-oxybutynin HCl Form B were exposed to 75% RH and 85% RH for 24 hours, in open containers. After 24 hours at 75% RH, the white solids remained free flowing and the XRPD pattern was consistent with Form B. After 24 hour at 85% RH, the white solids were not free flowing but XRPD analysis of the sample indicate that it was composed of Form B. After stressing at 93% RH the sample deliquesced.

Form C

In some embodiments, R-oxybutynin HCl Form C can be prepared as a single crystalline phase that competes with the formation of Form B using slurries of R-oxybutynin HCl in heptane or MIBK at RT over various periods of time. The XRPD pattern of R-oxybutynin HCl Form C is provided in FIG. 4 indicating the Form C material is composed primarily or exclusively of a single crystalline phase. The indexed volume indicates the sample is likely anhydrous based on considerations of molecular volume. The characterization data and method of preparation suggest R-oxybutynin HCl Form C is an anhydrous/unsolvated mono HCl salt of R-oxybutynin.

To a 3-necked round bottom flask equipped with an overhead stirrer, nitrogen inlet, temperature probe, was charged (R)-oxybutynin freebase (15.47 g, 210 moles, 1 eq) followed by MTBE (943 mL, 15.5 vol.). To the resulting solution was charged HCl in EtOAc (298 mL, 298 mmoles, 1 M HCl in ETOAc, 1.3 eq), over 45 minutes. A thick slurry formation was observed after addition of approximately one-fourth of the volume of HCl. The thick slurry was warmed to 40° C. and aged for an hour. The batch was then cooled to 0° C. (aged for 30 minutes), filtered under nitrogen and washed with 2×2 vol. (2×164 mL) of cold MTBE. The solids were dried in vacuum at 20-25° C. for 24 h to obtain crystals of (R)-oxybutynin hydrochloride Form C (83 g, 94% yield, 99% potency).

Figure 10:
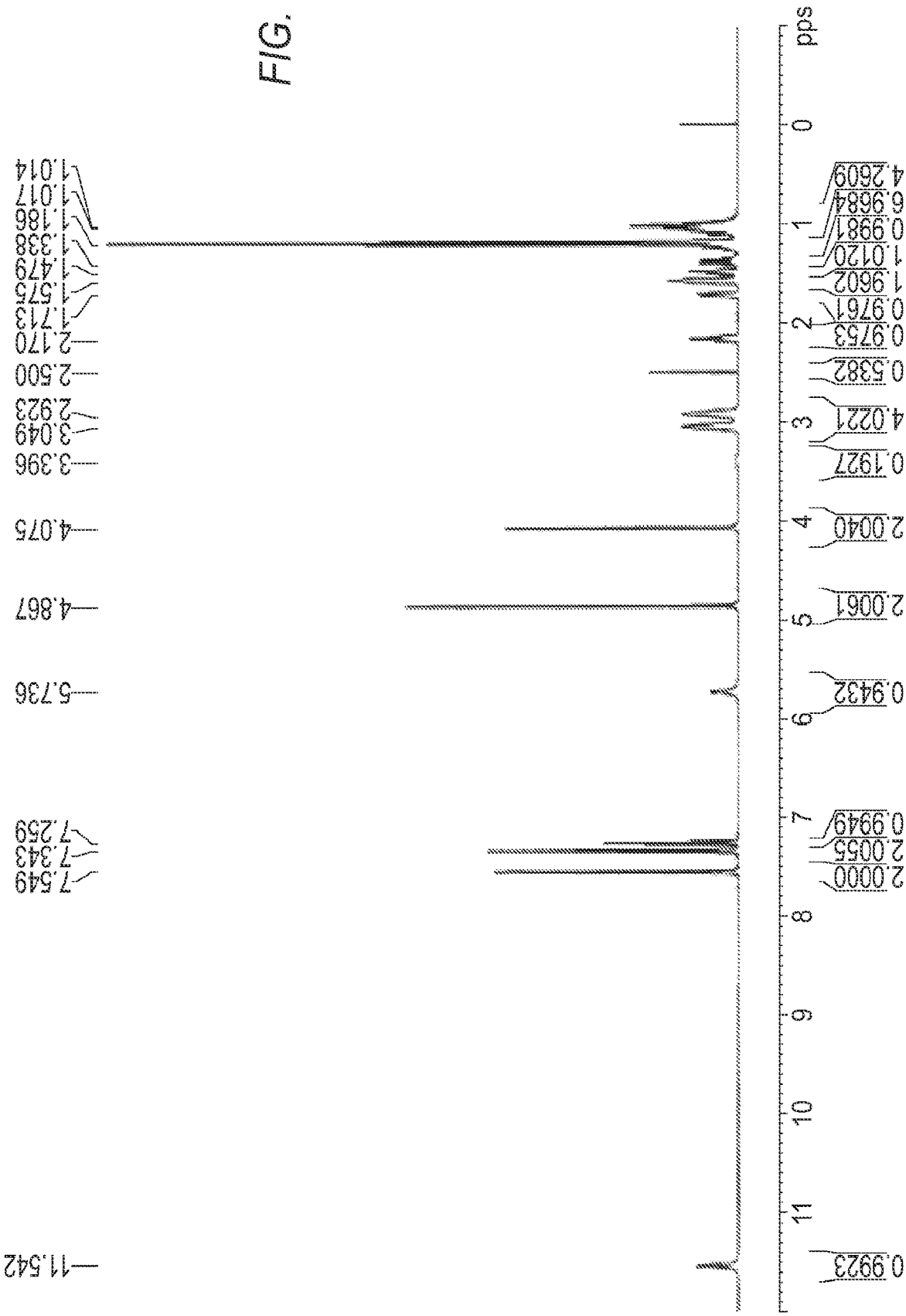
FIG. 10: $^1$H NMR spectrum of (R)-oxybutynin hydrochloride.
Figure 11:
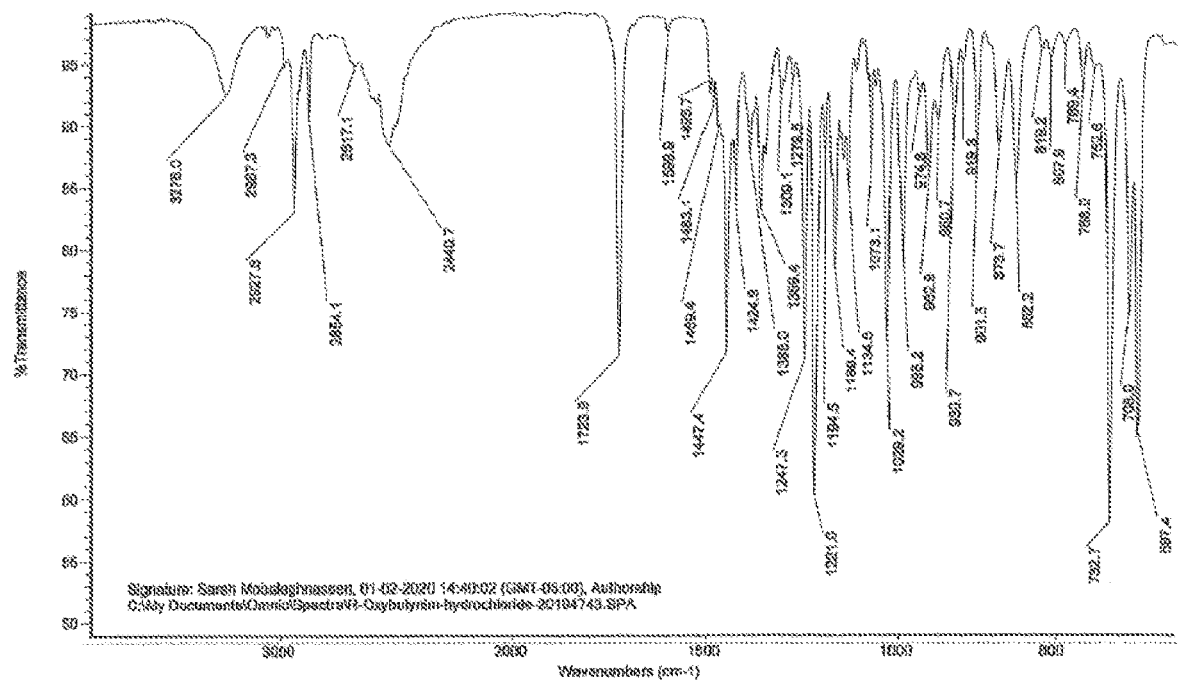
FIG. 11: FT-IR spectrum of (R)-oxybutynin hydrochloride Form C polymorph.

The $^1$H NMR spectra for R-oxybutynin HCl is provided in FIG. 10 and the FT-IR spectrum in provided in FIG. 11. Analysis of both the $^1$H NMR and FT-IR spectra indicates that the (R)-oxybutynin hydrochloride Form C material is consistent with the structure of the API.

Figure 12:
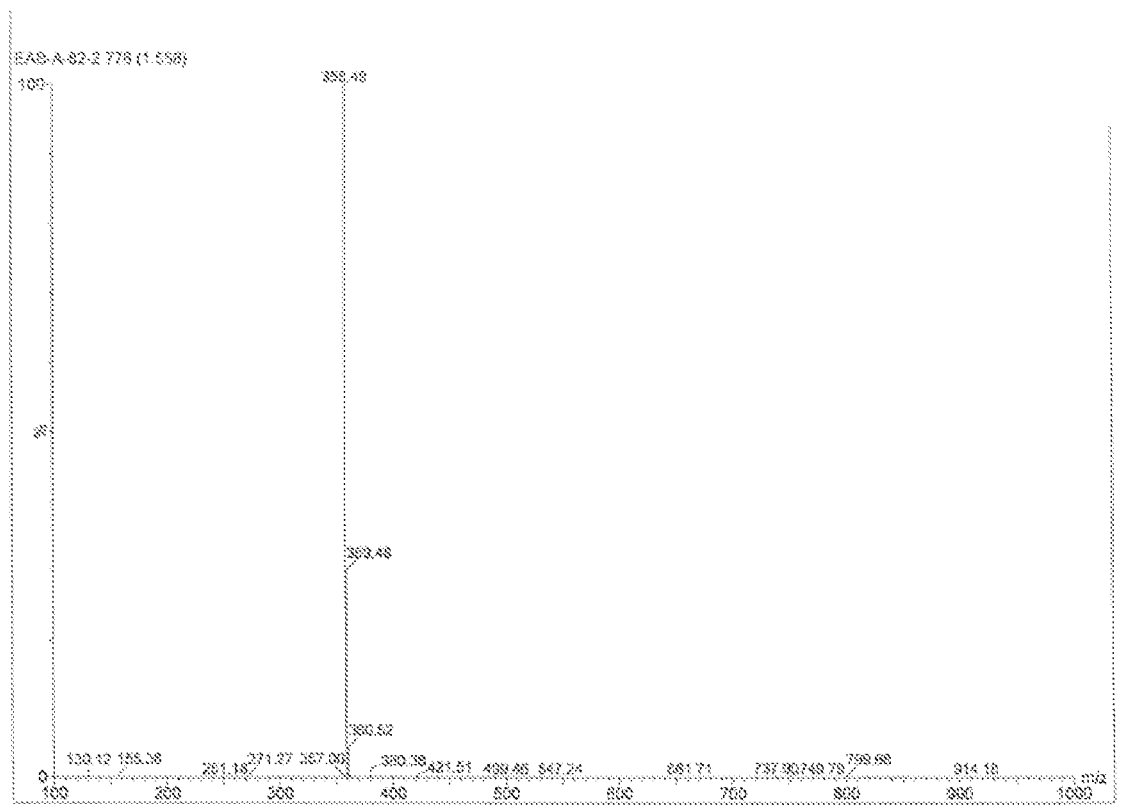
FIG. 12: LCMS Trace for (R)-oxybutynin hydrochloride Form C polymorph.
Figure 13:
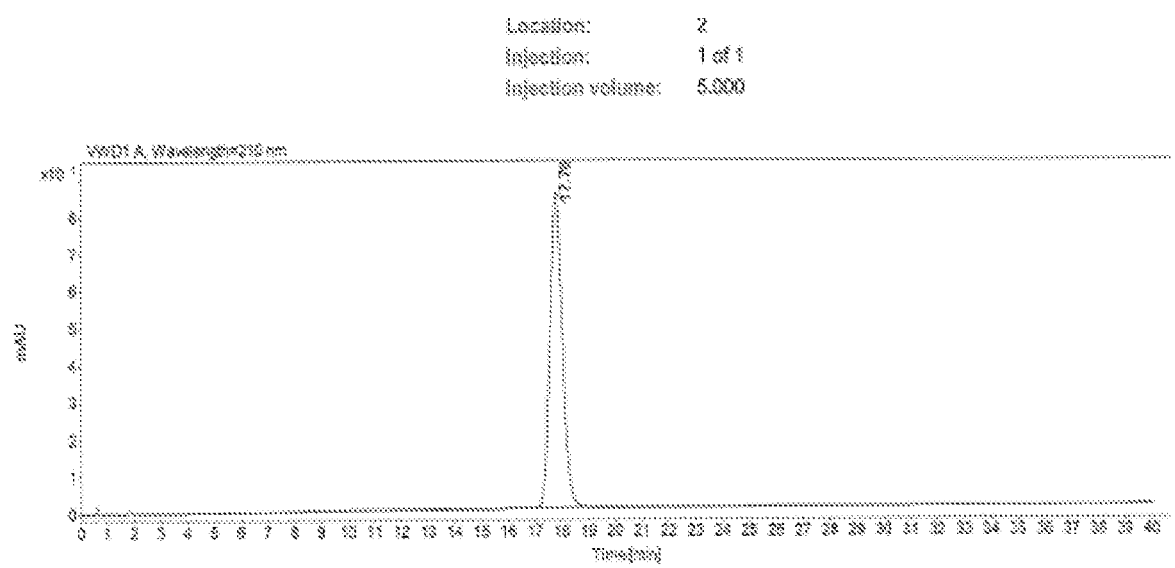
FIG. 13: Achiral HPLC Chromatogram of (R)-oxybutynin hydrochloride Form C polymorph.
Figure 14:
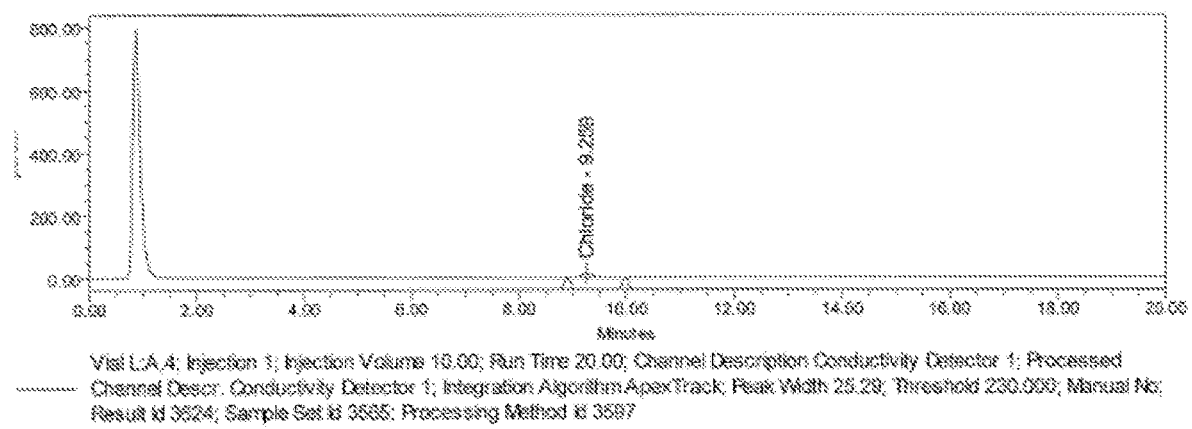
FIG. 14: Ion Chromatography of (R)-oxybutynin hydrochloride Form C polymorph.

A broad endotherm at 119.4° C. (peak max) is observed in the DSC thermogram (FIG. 7). A LCMS trace for the (R)-oxybutynin Form C in provided in FIG. 12 and illustrates the predominately single peak having a mass of 358.49 corresponding to the [M+1] mass of R-oxybutynin. Referring to FIG. 13, an achiral HPLC chromatogram of (R)-oxybutynin Form C denoting the purity of the Form C sample. Lastly, the IC analysis provided in the Ion Chromatogram of FIG. 14 confirms the presence of the chloride ion in an approximate 1:1 API:Cl-molar ratio suggesting a mono chloride salt of R-oxybutynin in the Form C material.

The target R-oxybutynin stereoisomer can be prepared by chromatographic separation of a racemic mixture of oxybutynin using a chiral selective resin, Lux Amylose-1. The isolated freebase can then be converted to the Form C hydrochloride salt. A synthesis scheme for the formation of the hydrochloride salt is shown below.

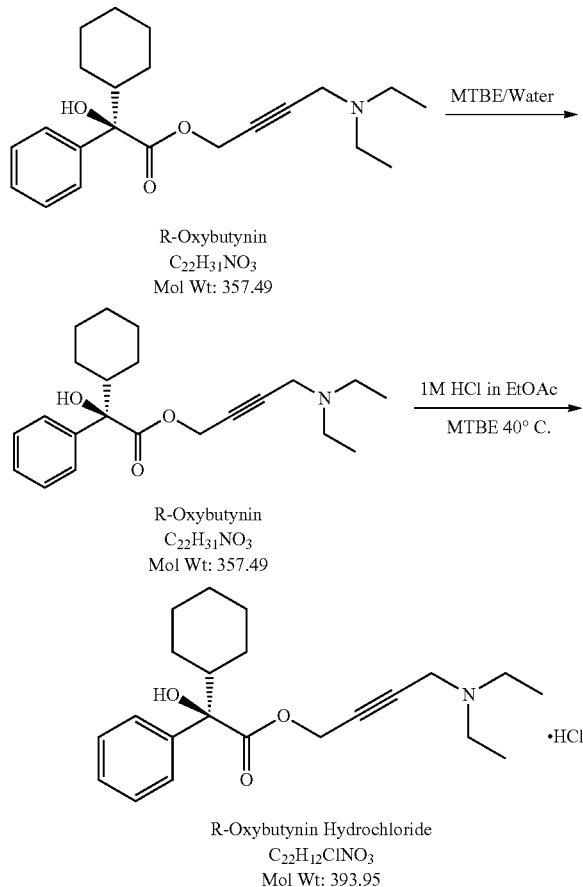

R-Oxybutynin
$C_{22}H_{31}NO_3$
Mol Wt: 357.49

R-Oxybutynin
$C_{22}H_{31}NO_3$
Mol Wt: 357.49

R-Oxybutynin Hydrochloride
$C_{22}H_{12}ClNO_3$
Mol Wt: 393.95

The first step of the scheme is performed to remove residual diethyl amine (DEA) that is entrained in the freebase product from the purification step. The second step involves the carbon treatment of the R-oxybutynin freebase and the reverse addition of the MTBE freebase solution in portions to a HCl solution to form the hydrochloride salt. The reverse order of addition prevents product precipitation on the reactor walls as a glass or shell. An exemplary process for production of Form C oxybutynin hydrochloride is provided in further detail as follows.

R-Oxybutynin (611 g) was dissolved in methyl tert-butyl ether (MTBE) (6L) with stirring. Purified water (3L) was added and the batch stirred for 15 minutes. The layers were allowed to separate, and the lower aqueous phase was removed. Two further washes of the MTBE layer with Purified water (2×3L) were performed and the combined lower aqueous phases were checked for product content before sending to waste. The organic phase was filtered into a pre-weighed, clean, dry rotary evaporator bulb, which was then attached to a rotary evaporator. The bath temperature was set to 33° C. and the contents of the bulb were concentrated until distillation ceased. MTBE (6L) was added to the rotary evaporator bulb and the contents concentrated until distillation ceased. A final charge of MTBE (6L) was added to the rotary evaporator bulb and the contents concentrated until distillation ceased. A sample from the rotary evaporator bulb was analyzed for residual water by Karl Fischer titration (typical results about 0.2%).

The contents of the rotary evaporator bulb were dissolved in MTBE (4.6L), and Darco G60 (activated carbon) (61.3 g) was added. The batch was stirred for at least 1 hour before filtering through a Celite Pad. MTBE (1L) was used to rinse any material from the reactor to the filter cake. The filtrate was collected in a clean glass carboy labeled Charcoal Treated Batch. A solution of MTBE (3.0L) and 1 M HCl/EtOAc (2.32L) were inline filtered into a clean vessel. The batch temperature was set to 20±5° C. The Charcoal Treated Batch (1.2L) was charged over 20 minutes while maintaining the batch temperature at 20±5° C. R-Oxybutynin HCl seeds (3.2 g) were charged and stirred for 5 minutes. The balance of the Charcoal Treated Batch (4.8L) was charged over 33 minutes while maintaining the batch temperature at 20±5° C. An MTBE (640 mL) wash of the Charcoal Treated Batch container was added to the crystallizer. The batch was stirred at 20±5° C. for 35 minutes. The batch temperature was adjusted to 35±5° C. over 30 minutes. The batch was stirred at this temperature for over 2 hours before adjusting to 0±5° C. over 2 hours. The batch was stirred at 0±5° C. for at least 10 hours before isolating the solids by filtration. Two washes of pre-chilled MTBE (1.8L×2) were in-line filtered and charged to the reactor to dislodge any solids from the reactor before passing through the filter cake. The wet filter cake was transferred to drying trays and placed in a vacuum oven at 25±5° C. until the residual solvents met specification. The 582 g of dry product was packaged and sampled. The process produced the Form C HCl salt of R-oxybutynin at high yield, including a batch yield of 86.5%.

An alternative process can be used to remove the DEA impurity without the use of an aqueous extraction of the MTBE layer. When the R-oxybutynin freebase is dissolved in MTBE, the DEA separates as an insoluble precipitate along with an impurity. The MTBE solution can therefore be carbon-treated, and the subsequent filtration of the carbon will also remove the DEA and the impurity. The water-azeotrope step can then be omitted as there is no water to remove prior to the HCl salt formation. The filtered MTBE solution of freebase can then be added directly to the solution of MTBE and 1 M HCl/EtOAc solution Another process for producing R-oxybutynin HCl Form C is described in Example 27. In general, in some embodiments, provided herein is a process for producing crystalline R-oxybutynin HCl of Form C, the process comprising isolating (R)-oxybutynin from racemic oxybutynin via chiral resolution with D-malic acid (or other optically active acid); and adding HCl to the isolated (R)-oxybutynin to produce crystalline (R)-oxybutynin HCl of Form C. In some embodiments, isolating (R)-oxybutynin from racemic oxybutynin comprises adding D-malic acid (or other optically active acid) to racemic oxybutynin free base. In some embodiments, D-malic acid (or other optically active acid) is added to racemic oxybutynin free base in the presence of 2-propanol. In some embodiments, the HCl is added in the presence of ethyl acetate. In some embodiments, the process further comprises adding MTBE to the isolated (R)-oxybutynin after addition of HCl. Other optically active acids (e.g., tartaric acid) may be used for chiral resolution of oxybutynin in place of D-malic acid.

(R)-Oxybutynin Citrate Material

In some embodiments, R-oxybutynin citrate material can be prepared by precipitating R-oxybutynin citrate from solutions resulting from the addition of diethyl ether to p-dioxane solutions containing 2:1, 1:1, or 1:2 molar ratios of (R)-oxybutynin and citric acid stirring at RT. In some embodiments, a gel phase is observed prior to producing the solid R-oxybutynin Citrate material. Solid R-oxybutynin citrate typically precipitated within 1 hour of stirring at RT and was allowed to stir further for 7-10 days.

$^1$H NMR analysis performed on the two samples of R-oxybutynin citrate material generated from experiments confirmed a 2:1 and 1:1 molar ratio of API to acid. The $^1$H NMR spectra for the two samples confirm the presence of both R-oxybutynin and citric acid, but indicate the presence of excess amounts of citric acid (e.g., 1:2.6 and 1:1.3 API:citric acid mole ratio).

EXAMPLES

Instrument and Methodology

A. X-Ray powder Diffraction (XRPD)

Two x-ray diffractometer instruments were used to collect X-ray diffraction patterns as described below.

a. PANalytical X'Pert PRO MPD or PANalytical Empyrean diffractometer-Transmission XRPD patterns were collected with a PANalytical X'Pert PRO MPD or PANalytical Empyrean diffractometer using an incident beam of Cu radiation produced using a long, fine-focus source. An elliptically graded multilayer mirror was used to focus Cu Kα X-rays through the specimen and onto the detector. Prior to the analysis, a silicon specimen (NIST SRM 640e) was analyzed to verify the observed position of the Si 111 peak is consistent with the NIST-certified position.

A specimen of the sample was sandwiched between 3-μm-thick films and analyzed in transmission geometry. A beam-stop, short antiscatter extension, and antiscatter knife edge were used to minimize the background generated by air. Soller slits for the incident and diffracted beams were used to minimize broadening and asymmetry from axial divergence. Diffraction patterns were collected using a scanning position-sensitive detector (X'Celerator) located 240 mm from the specimen and Data Collector software v. 2.2b or 5.5. The data acquisition parameters were as follows: X-ray Tube: Cu (1.54059 Å), Voltage: 45 kV, Amperage: 40 mA, Scan Range: 1-40° 2θ, Step Size: 0.017°2θ, Scan Speed: 3.3°/min, Slit: DS: Fixed slit ½°, SS: null, Revolution Time 1.0 s. All images have the instrument labeled as X'Pert PRO MPD regardless of the instrument used.

b. PANalytical X'PERT Pro MPD Diffractometer-Reflection

XRPD patterns were collected with a PANalytical X'Pert PRO MPD diffractometer using an incident beam of Cu Kα radiation produced using a long, fine-focus source and a nickel filter. The diffractometer was configured using the symmetric Bragg-Brentano geometry. Prior to the analysis, a silicon specimen (NIST SRM 640e) was analyzed to verify the observed position of the Si 111 peak is consistent with the NIST-certified position. A specimen of the sample was prepared as a thin, circular layer centered on a silicon zero-background substrate. Antiscatter slits (SS) were used to minimize the background generated by air. Soller slits for the incident and diffracted beams were used to minimize broadening from axial divergence. Diffraction patterns were collected using a scanning position-sensitive detector (X'Celerator) located 240 mm from the sample and Data Collector software v. 5.5. The data acquisition parameters were as follows: X-ray Tube: Cu (1.54059 Å), Voltage: 45 kV, Amperage: 40 mA, Scan range: 3.51-40° 2θ, Step size: 0.017 °2θ, Scan speed: 1.2°/min, Slit: DS: Fixed slit ⅛°, SS: Fixed slit ¼°.

B. Nuclear Magnetic Resonance (NMR): $^1$H NMR and $^{13}$C NMR

Solution $^1$H NMR spectra were acquired with an Agilent DD2-400 spectrometer or an Avance 600 MHz NMR Spectrometer. Samples were prepared by dissolved in DMSO-d6 containing TMS.

C. Thermogravimetric Analysis/Differential Scanning calorimetry (TGA/DSC)

TGA/DSC analyses were performed using a Mettler-Toledo TGA/DSC3+analyzer. Temperature calibration was performed using, indium, tin, and zinc. The sample was placed in a closed aluminum pan. The pan was hermetically sealed, the lid pierced, then inserted into the TG furnace. A weighed aluminum pan configured as the sample pan was placed on the reference platform. The furnace was heated under nitrogen. The data acquisition parameters for the thermogram are displayed in the image in the Figure section of this report.

D. Thermogravimetric Analysis-Infrared Spectroscopy

Thermogravimetric infrared (TG-IR) analysis was performed on a TA Instruments Q5000 IR thermogravimetric (TG) analyzer interfaced to a Magna-IR 560® Fourier transform infrared (FT-IR) spectrophotometer (Thermo Nicolet) equipped with an Ever-Glo mid/far IR source, a potassium bromide (KBr) beamsplitter, and a mercury cadmium telluride (MCT-A) detector. The FT-IR wavelength verification was performed using polystyrene, and the TG calibration standards were nickel and Alumel™. The sample was placed in a platinum sample pan, and the pan was inserted into the TG furnace. The TG instrument was started first, immediately followed by the FT-IR instrument. The TG instrument was operated under a flow of helium at 90 and 10 cc/min. for the purge and balance, respectively. The furnace was heated under helium at a rate of 10° C./minute to a final temperature of 350° C. IR spectra were collected approximately every 32 seconds for approximately 13.5 minutes. Each IR spectrum represents 32 co-added scans collected at a spectral resolution of 4 cm-1. Volatiles were identified from a search of the High Resolution Nicolet Vapor Phase spectral library.

E. Ion Chromatography (IC)

Ion chromatography analyses were performed using a Dionex ICS-5000+series ion chromatograph. The ICS-5000+consists of two chromatography systems that share an autosampler. The system used for anion detection was equipped with a gradient pump, an eluent generator module, a conductivity detector, and a suppressor (AERS 4 mm). A Dionex UTAC-ULP1 5×23 mm concentrator column was installed in place of the sample loop. A Dionex IonPac™ AG19 4×50 mm guard column and a Dionex IonPac™ AS19 4×250 mm analytical column were installed. Water (18.2 MSΩ, dispensed from ELGA Purelab Flex 2) was used to fill the eluent reservoir, for standard preparations, and for autosampler flush. DMSO was used for sample preparation and associated blank injections.

| | |
|---|---|
| Run Time: 25.000 min | Flow Rate: 1.000 mL/min |
| Injection Volume: 100.0 µL | Data Collection Rate: 5.0 Hz |
| Detector Rise Time: 0.50 sec | |
| Cell Temperature: 30° C. | Column Temperature: 30° C. |
| Compartment Temperature: 30° C. | Autosampler Temperature: 30° C. |
| Suppressor Current: 124 mA | Eluent Generator Cartridge: EGC III KOH |

| Eluent Concentration Gradient | |
|---|---|
| Time (min) | Concentration (mM) |
| 0.000 | 3.5 |
| 10.000 | 15.00 |
| 20.000 | 40.00 |
| 22.000 | 40.00 |
| 22.500 | 3.5 |
| 25.000 | 3.50 |

Examples 1-11. Isolation of Solid (R)-Oxybutynin as crystalline Forms A, B, and C Examples 1-11 focused on optimizing solvent volumes and co-solvent addition to understand the impact of hydrochloric acid (HCl) equivalents and the effect of temperature on the (R)-oxybutynin salt formation. Preliminary screening of the reaction conditions are summarized in Table 1.

The hydrochloride salt of R-oxybutynin was initially prepared using 3.3 equivalents of HCl in isopropanol. As seen in Examples 1-4 of Table 1 below, independent of the solvent volumes or combinations, using three times the equivalents of HCl resulted in an oily form of the salt. A combination of ethyl acetate/MTBE with sub-stoichiometric charges of HCl yielded oil as well (see Example 5). The isopropanol and MTBE combination provided in Example 5 resulted in needles of the hydrochloride salt. These solids retained 13 wt % of isopropanol (1:1 mole ratio of API to isopropanol) after extensive drying on high vacuum but did not correspond to any of the known forms of R-oxybutynin hydrochloride, neither did the solids that crystallized from isopropanol with 0.95 equivalent of HCl after 48 hours (see Examples 6 and 7).

Further analysis demonstrated a 5 g (see Example 8) and a 10 g (see Example 9) scale up of the reaction conditions mentioned in Example 5 when stirred for a shorter time (1 hour) at 20° C. resulted in the crystallization of Form A solids. Form A is a hygroscopic isopropanol solvate of R-oxybutynin hydrochloride retaining 11-13 wt % of the solvent.

The salt formation reaction when performed in MTBE (see Example 10) at a ten degree higher temperature (35° C.) resulted in powdery solids retaining very low percentage of water (1.6 wt %). These solids were non-hygroscopic and corresponded to a new powder XRPD pattern. $^1$H NMR spectrum matched the achiral reference standard of R-oxybutynin purchased from Sigma-Aldrich. The new powder diffraction pattern observed was named Form C. The salt formation when performed in cyclopentyl methyl ether (CPME) also resulted in Form C solids (see Example 11).

non-hygroscopic solids of Form C. The solids were isolated in 71% yield with 0.62% residual water (see Example 12, Table 2).

Recrystallizations performed at elevated temperatures in tetrahydrofuran and ethyl acetate with MTBE as the anti-solvent (see Examples 13 and 14) using solids of Form A ("Form A Solids") also resulted in Form C demonstrating the stability of Form C.

A reslurry of Form A in MTBE at 50° C. performed for 24 hours resulted in Form C crystals as well (see Example 15).

TABLE 1

Preparation of R-Oxybutynin Hydrochloride

| Example | Reaction Conditions | % Yield | Comments | XRPD |
|---|---|---|---|---|
| 1 | IPA (10 vol.)<br>1.25M HCl in IPA (3.3 eq)<br>20-30° C./24 h/concentrate | ND$^a$ | Oil | ND |
| 2 | IPA (10 vol.)<br>MTBE (8 vol.)<br>1.25M HCl in IPA (3.3 eq)<br>20-30° C./24 h/concentrate | ND | Oily solids | ND |
| 3 | IPA (2 vol.)<br>1.25M HCl in IPA (3.3 eq)<br>20-30° C./24 h/concentrate | ND | Yellow oil | ND |
| 4 | 1.25M HCl in IPA (3.3 eq)<br>20-30° C./24 h/concentrate | ND | Thick Oil | ND |
| 5 | EtOAc (4 vol.),<br>MTBE (15 vol.)<br>1M HCl in EtOAc (0.88 eq)<br>35-45° C./1 h/concentrate | 87 | Oil<br>(EtOAc in 28 wt %) | ND |
| 6 | IPA (4 vol.)<br>MTBE (15 vol.)<br>1.25M HCl in IPA (1.1 eq)<br>20-30° C./1 h/filter | 88 | Solids<br>(13 wt % IPA, 2.4 wt % H$_2$O$^b$) | Neither Form A or B |
| 7 | IPA (10 vol.)<br>1.25M HCl in IPA (0.95 eq)<br>20-30° C./3 days/filter | 73 | Fluffy solids<br>(13 wt % IPA, 5.2 wt % H$_2$O) | Neither Form A or B |
| 8 | IPA (10 vol.)<br>1.25M HCl in IPA (0.95 eq)<br>20-30° C./1 h/filter | 92 | Needles<br>(13 wt % IPA, no H$_2$O$^b$) | Form A |
| 9 | IPA (10 vol)<br>1.25M HCl in IPA (0.95 eq)<br>20-30° C./1 h/0° C., 0.5 h | 78 | (needles, 11.5 wt % IPA and 0.5 wt % DEA)$^c$. Product in filtrates, (23%, 11 wt % IPA, 9.9 wt % DEA). | Form A |
| 10 | MTBE (10 vol.)<br>1.0M HCl in EtOAc (1.1 eq)<br>20-30° C./1 h/filter | 75 | Needles<br>(1.6 wt % H$_2$O) | Form C |
| 11 | CPME (10 vol)<br>3.0M HCl in CPME (0.95 eq)<br>40° C./1 h/Filter | 77 | Solids<br>(1.6 wt % by NMR, 3.4 wt % DEA) | Form C |

$^a$Not determined
$^b$Hygroscopic solids
$^c$DEA is diethylamine

Examples 12-17. Isolation of Solid (R)-Oxybutynin as Crystalline Forms A, B, and C Form A was believed to be a reasonable starting material to produce the more stable Form B. Table 2 summarizes the efforts towards the synthesis of Form B from Form A. Acetone and heptane recrystallization of the oil of R-oxybutynin hydrochloride (see Example 5, Table 1) yielded The same Form was also generated after a seeded recrystallization of Form A in toluene at 70° C. (see Example 16) with Form B seeds. Higher temperature vacuum drying (50° C. for 24 h) also did not convert Form A to Form B (see Example 17), instead Form C was isolated. Thus, Form C was found to be a highly stable form. Form C diffraction patterns were observed after prolonged slurrying of both Form A and Form B in both MIBK and heptanes separately, indicating Form C as a thermodynamically preferred and more stable polymorph of R-oxybutynin hydrochloride.

TABLE 2

Recrystallization of R-Oxybutynin HCl Form A

| Ex. | Experiment | Reaction Conditions | Yield | Isolated product | XRPD |
|---|---|---|---|---|---|
| 12 | R-oxybutynin HCl (1 g, Form A Solids) | Acetone (3 vol.) Heptanes (10 vol.) 20-25° C. Seeded | (71%) Powdery solids | The reaction mixture was seeded with Form A Solids, and this promoted crystallization. The batch was cooled to 0° C. and the filtered solids were, dried at 20-25° C. Residual water seen in 0.62 wt %. | Form C |
| 13 | R-oxybutynin HCl Form A (500 mg, Form A Solids) | EtOAc (14 vol.) MTBE (10 vol.) 50° C., 3 h Cooled to 0° C. Reslurry | (97%) Powdery solids | Cooled and filtered the solids, $^1$H NMR indicated 3.5 wt % DEA, 1.7 wt % $H_2O$ | Form C |
| 14 | R-oxybutynin HCl Form A (500 mg, Form A Solids) | THF (3.4 vol) MTBE (10 vol) 50° C., 3 h Cooled to 0° C. Reslurry | (69%) Powdery solids | Cooled filtered and dried the oil/solid melting at 20-25° C. which on 20-25° C. drying over the weekend resulted in-solids. $^1$H NMR indicated 2.5 wt % DEA, 2.5 wt % $H_2O$, and 1.2 wt % IPA. | Form C |
| 15 | R-oxybutynin HCl Form A (1 g, Form A Solids) | MTBE (10 vol.) 50° C., 24 h Cooled to 0° C. Reslurry | (100%) Powdery solids | Powdery solids, $^1$H NMR indicated 2.5 wt % Diethylamine, 1.7 wt % $H_2O$ | Form C |
| 16 | R-oxybutynin HCl Form A (580 mg, Form A Solids) | Toluene (9 vol) 70° C., 2 h Cooled to 0° C. Seeded recrystallization | (94%) Powdery solids | Cooled filtered and dried at 20-25° C. $^1$H NMR indicated 2.6 wt % DEA, 1.5 wt % $H_2O$. No residual toluene. | Form C |
| 17 | Drying Form A at 50° C. for 2 days | N/A | N/A | High temp drying of Form A | Form C |

Examples 18-20. Further Preparations

R-Oxybutynin freebase was treated with HCl in IPA resulting in Form A solids as expected. There was no noticeable difference in the powder diffraction pattern of Form A with or without diethylamine. Form C was isolated from the salt formation reaction performed in MTBE (see Examples 18-19 of Table 3).

Recrystallization of purified Form A was performed in toluene at 70° C. with seeds of Form B. The isolated product corresponded to Form C by XRPD (see Example 20).

TABLE 3

Further Preparation of R-Oxybutynin HCl

| Ex. | Input/Scale | Conditions | % Yield | XRPD | Comments |
|---|---|---|---|---|---|
| 18 | R-oxybutynin (820 mg) (free of DEA, 95.6% potent) | 10 vol isopropanol 1.25M HCl in IPA (0.95 eq) 20-25° C., 1 h 0° C., 0.5 h | (87) Powdery solids | Form A | 13 wt % IPA by $^1$H NMR |
| 19 | R-oxybutynin (820 mg) (free of DEA, 95.6% potent) | 15.5 vol MTBE 1.0M HCl in EtOAc (0.95 eq) 40° C., 1 h | (68) Powdery solids | Form C | $H_2O$ in 0.8 wt % by $^1$H NMR |
| 20 | R-oxybutynin HCl Form A (free of DEA) (solids, 410 mg) | Toluene (4.9 mL, 12 vol.) 70° C./1 h recrystallization (seeds of Form B) | (93) Powdery solids | Form C | $H_2O$ in 0.6 wt % by $^1$H NMR |

Examples 21-26. Process Development

Examples 1-20 provided support that the preparation of Form B was not straight forward or reproducible and would be difficult to scale up. Accordingly, additional examples were performed to prepare Form C of the (R)-oxybutynin hydrochloride salt. MTBE was the best choice to demonstrate formation of non-solvated Form C. Table 4 provides the summary of the process development. As indicated in Examples 21 and 22 of Table 4, the reaction of (R)-oxybutynin freebase with sub-stoichiometric equivalents of HCl in ethyl acetate yielded only 60-65% of the salt with a potency of 99%.

The yield for the process improved with increase in the charge of HCl. As seen previously, 1.1 equivalents of HCl yielded 82% of the product. On the other hand, a charge of 1.5 equivalents of HCl improved recovery to 96%, with a potency drop of 3%. The optimal conditions involved a charge of 1.3 equivalents of HCl resulting in a potency of 98% and an isolated yield of 90% (Examples 23-25 of Table 4).

With these results, the process was demonstrated (see Example 26) successfully on an 83 g input of R-oxybutynin using 1.3 equivalents of 1.0 M HCl in ethyl acetate. The solids confirmed to the XRPD pattern for Form C (83 g, 94% yield, 99% potency). Thus, production of Form C was advantageously able to be scaled up.

Form C isolated from all the runs summarized in Table 4 retained 0.5-0.6 wt % water except in Example 21 where 0.8 equivalents of HCl was used (1.5 wt % of water retained).

Figure 8:
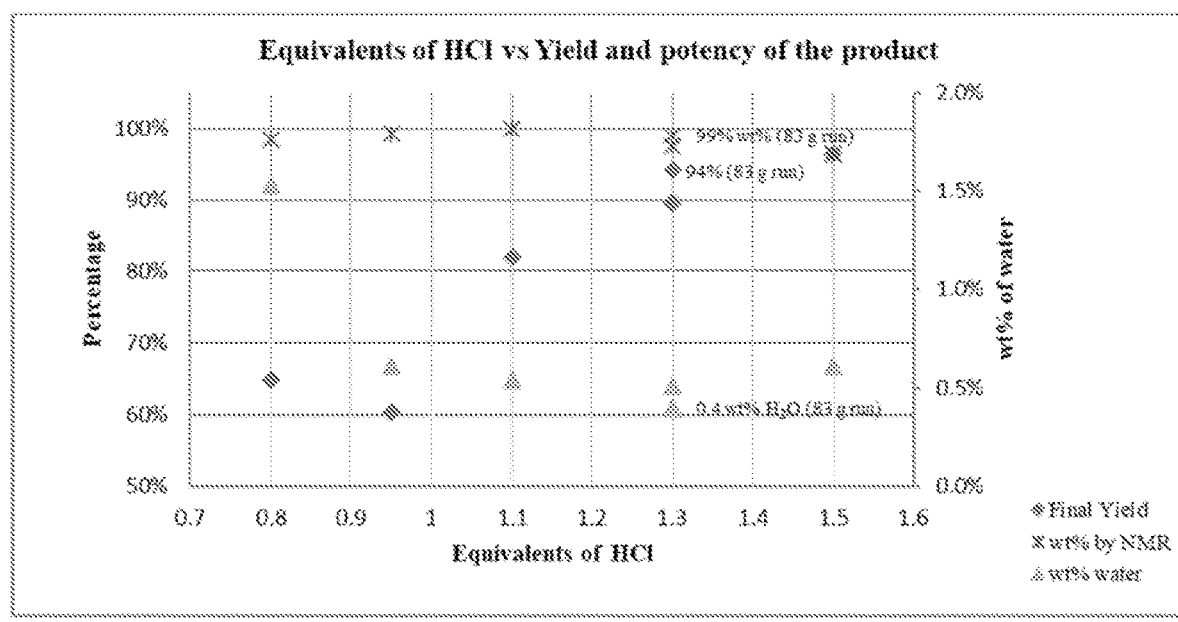
FIG. 8: Plot of Yield and Potency versus HCl Equivalents in the Synthesis of (R)-oxybutynin HCl.

The results from Table 4 below are summarized graphically in FIG. 8.

TABLE 4

Preparation of R-Oxybutynin HCl Form C from R-Oxybutynin Free Base

| Ex. | Input/Scale | Conditions | % Yield [a] | Potency (wt %) | XRPD | Comments |
|---|---|---|---|---|---|---|
| 21 | R-oxybutynin (1 g) | 15.5 vol MTBE<br>1.0M HCl in EtOAc<br>(0.8 equiv.)<br>40° C., 1 h<br>0° C., 0.5 h | (0.74 g, 65%)<br>Powdery solids | 99 | Form C | $H_2O$ in 1.5 wt % by $^1H$ NMR. |
| 22 | R-oxybutynin (10 g) | 15.5 vol MTBE<br>1.0M HCl in EtOAc<br>(0.95 equiv.)<br>40° C., 1 h<br>0° C., 0.5 h | (6.7 g, 60%)<br>Powdery solids | 99.5 | Form C | $H_2O$ in 0.6 wt % by $^1H$ NMR. Filtrates showed 34% unreacted free base. |
| 23 | R-oxybutynin (3.4 g) | 15.5 vol MTBE<br>1.0M HCl in EtOAc<br>(1.1 equiv.)<br>40° C., 1 h<br>0° C., 0.5 h | (3.0 g, 82%)<br>Powdery solids | 100 | Form C | $H_2O$ in 0.5 wt % by $^1H$ NMR. Filtrates showed 7% unreacted free base. |
| 24 | R-oxybutynin (3.6 g) | 15.5 vol MTBE<br>1.0M HCl in EtOAc<br>(1.3 equiv.)<br>40° C., 1 h<br>0° C., 0.5 h | (3.4 g, 90%)<br>Powdery solids | 98 | Form C | $H_2O$ in 0.5 wt % by $^1H$ NMR. Filtrates showed 8% unreacted free base. |
| 25 | R-oxybutynin (3.6 g) | 15.5 vol MTBE<br>1.0M HCl in EtOAc<br>(1.5 equiv.)<br>40° C., 1 h<br>0° C., 0.5 h | (3.7 g, 96%)<br>Powdery solids | 96 | Form C | $H_2O$ in 0.5 wt % by $^1H$ NMR. Filtrates showed 1% unreacted free base. |
| 26 | R-oxybutynin (67.2 g) | 15.5 vol MTBE<br>1.0M HCl in EtOAc<br>(1.3 equiv.)<br>40° C., 1 h<br>0° C., 0.5 h | (83 g, 94%)<br>Powdery solids | 99 | Form C | $H_2O$ in 0.4 wt % by $^1H$ NMR. A 4% yield loss of product seen in the filtrates (oil). No unreacted freebase seen in filtrates. |

[a] Corrected Yield for both input and output.

Characterization of (R)-Oxybutynin Forms A, B, and C

A sample of each of the three crystalline polymorphs of R-oxybutynin HCl were analyzed using XRPD analysis. The Form A, B, and C XRPD patterns for R-oxybutynin HCl did not match any of the known polymorphic forms for oxybutynin or(S)-oxybutynin. Referring to FIG. 1, an overlay of the Form A, B, and C XRPD patterns for R-oxybutynin HCl is provided. The individual XRPD patterns for Form A and Form B are displayed in FIGS. 2 and 3, respectively. A listing of the Form A and Form B XRPD peaks illustrated in FIGS. 2 and 3 are provided in Tables 5 and 6 below. Table 7 provides a listing of the XRPD peaks corresponding to the Form C R-oxybutynin HCl polymorph illustrated in FIG. 4.

TABLE 5

XRPD peaks of Form A at ambient RH

| Caption | Angle degrees (2θ) | d space (Å) | Intensity (%) |
|---|---|---|---|
| 6.07 | 6.07 ± 0.20 | 14.549 ± 0.479 | 80 |
| 7.7 | 7.70 ± 0.20 | 11.472 ± 0.298 | 52 |
| 9.11 | 9.11 ± 0.20 | 9.7 ± 0.212 | 13 |
| 10.47 | 10.47 ± 0.20 | 8.442 ± 0.161 | 14 |
| 12.14 | 12.14 ± 0.20 | 7.285 ± 0.120 | 16 |
| 12.86 | 12.86 ± 0.20 | 6.878 ± 0.107 | 52 |
| 13.45 | 13.45 ± 0.20 | 6.578 ± 0.097 | 9 |
| 13.73 | 13.73 ± 0.20 | 6.444 ± 0.093 | 8 |
| 14.57 | 14.57 ± 0.20 | 6.075 ± 0.083 | 22 |
| 15.31 | 15.31 ± 0.20 | 5.783 ± 0.075 | 18 |
| 15.46 | 15.46 ± 0.20 | 5.727 ± 0.074 | 28 |
| 16.65 | 16.65 ± 0.20 | 5.320 ± 0.063 | 27 |
| 17.63 | 17.63 ± 0.20 | 5.027 ± 0.057 | 27 |
| 18.3 | 18.30 ± 0.20 | 4.844 ± 0.052 | 36 |
| 18.82 | 18.82 ± 0.20 | 4.711 ± 0.050 | 18 |
| 19.22 | 19.22 ± 0.20 | 4.614 ± 0.048 | 100 |
| 19.49 | 19.49 ± 0.20 | 4.551 ± 0.046 | 27 |
| 20.84 | 20.84 ± 0.20 | 4.259 ± 0.040 | 21 |
| 21.03 | 21.03 ± 0.20 | 4.221 ± 0.040 | 16 |
| 21.56 | 21.56 ± 0.20 | 4.118 ± 0.038 | 45 |
| 22.03 | 22.03 ± 0.20 | 4.032 ± 0.036 | 16 |
| 22.27 | 22.27 ± 0.20 | 3.989 ± 0.035 | 12 |
| 22.8 | 22.80 ± 0.20 | 3.897 ± 0.034 | 28 |
| 23.23 | 23.23 ± 0.20 | 3.826 ± 0.032 | 14 |
| 23.62 | 23.62 ± 0.20 | 3.764 ± 0.031 | 14 |
| 23.8 | 23.80 ± 0.20 | 3.736 ± 0.031 | 13 |
| 23.96 | 23.96 ± 0.20 | 3.711 ± 0.031 | 14 |
| 24.59 | 24.59 ± 0.20 | 3.617 ± 0.029 | 16 |
| 25.14 | 25.14 ± 0.20 | 3.540 ± 0.028 | 15 |
| 25.67 | 25.67 ± 0.20 | 3.468 ± 0.027 | 10 |
| 25.95 | 25.95 ± 0.20 | 3.431 ± 0.026 | 13 |
| 26.57 | 26.57 ± 0.20 | 3.352 ± 0.025 | 13 |
| 27.03 | 27.03 ± 0.20 | 3.296 ± 0.024 | 11 |
| 27.67 | 27.67 ± 0.20 | 3.222 ± 0.023 | 14 |
| 27.86 | 27.86 ± 0.20 | 3.199 ± 0.023 | 14 |
| 28.14 | 28.14 ± 0.20 | 3.168 ± 0.022 | 13 |
| 28.84 | 28.84 ± 0.20 | 3.093 ± 0.021 | 7 |
| 29.1 | 29.10 ± 0.20 | 3.066 ± 0.021 | 9 |
| 29.37 | 29.37 ± 0.20 | 3.038 ± 0.020 | 8 |
| 29.43 | 29.43 ± 0.20 | 3.032 ± 0.020 | 8 |
| 29.73 | 29.73 ± 0.20 | 3.003 ± 0.020 | 10 |
| 29.94 | 29.94 ± 0.20 | 2.982 ± 0.019 | 7 |
| 30.17 | 30.17 ± 0.20 | 2.960 ± 0.019 | 7 |

TABLE 6

XRPD peaks of Form B at ambient RH

| Caption | Angle degrees (2θ) | d space (Å) | Intensity (%) |
|---|---|---|---|
| 4.99 | 4.99 ± 0.20 | 17.695 ± 0.709 | 5 |
| 6.55 | 6.55 ± 0.20 | 13.484 ± 0.411 | 30 |
| 7.54 | 7.54 ± 0.20 | 11.715 ± 0.310 | 100 |
| 8.22 | 8.22 ± 0.20 | 10.748 ± 0.261 | 28 |
| 10 | 10.00 ± 0.20 | 8.838 ± 0.176 | 11 |
| 10.54 | 10.54 ± 0.20 | 8.387 ± 0.159 | 15 |
| 12.41 | 12.41 ± 0.20 | 7.127 ± 0.114 | 35 |
| 12.86 | 12.86 ± 0.20 | 6.878 ± 0.107 | 47 |
| 13.14 | 13.14 ± 0.20 | 6.732 ± 0.102 | 7 |
| 13.68 | 13.68 ± 0.20 | 6.468 ± 0.094 | 37 |
| 14.06 | 14.06 ± 0.20 | 6.294 ± 0.089 | 63 |
| 14.44 | 14.44 ± 0.20 | 6.129 ± 0.084 | 14 |
| 15.14 | 15.14 ± 0.20 | 5.847 ± 0.077 | 20 |
| 15.48 | 15.48 ± 0.20 | 5.720 ± 0.073 | 49 |
| 15.89 | 15.89 ± 0.20 | 5.573 ± 0.070 | 15 |
| 16.48 | 16.48 ± 0.20 | 5.375 ± 0.065 | 20 |
| 16.75 | 16.75 ± 0.20 | 5.289 ± 0.063 | 14 |
| 17.2 | 17.20 ± 0.20 | 5.151 ± 0.059 | 92 |
| 17.7 | 17.70 ± 0.20 | 5.007 ± 0.056 | 19 |
| 18.13 | 18.13 ± 0.20 | 4.889 ± 0.053 | 31 |
| 18.6 | 18.60 ± 0.20 | 4.767 ± 0.051 | 5 |
| 19.25 | 19.25 ± 0.20 | 4.607 ± 0.047 | 46 |
| 19.78 | 19.78 ± 0.20 | 4.485 ± 0.045 | 8 |
| 20.08 | 20.08 ± 0.20 | 4.418 ± 0.044 | 30 |
| 20.37 | 20.37 ± 0.20 | 4.356 ± 0.042 | 25 |
| 21.1 | 21.10 ± 0.20 | 4.206 ± 0.039 | 59 |
| 21.39 | 21.39 ± 0.20 | 4.151 ± 0.038 | 32 |
| 21.68 | 21.68 ± 0.20 | 4.096 ± 0.037 | 16 |
| 22.74 | 22.74 ± 0.20 | 3.907 ± 0.034 | 15 |
| 23.13 | 23.13 ± 0.20 | 3.842 ± 0.033 | 23 |
| 23.38 | 23.38 ± 0.20 | 3.802 ± 0.032 | 22 |
| 24.12 | 24.12 ± 0.20 | 3.687 ± 0.030 | 18 |
| 24.35 | 24.35 ± 0.20 | 3.652 ± 0.030 | 41 |
| 25.06 | 25.06 ± 0.20 | 3.55 ± 0.028 | 22 |
| 25.44 | 25.44 ± 0.20 | 3.499 ± 0.027 | 14 |
| 25.95 | 25.95 ± 0.20 | 3.430 ± 0.026 | 9 |
| 26.37 | 26.37 ± 0.20 | 3.377 ± 0.025 | 16 |
| 26.74 | 26.74 ± 0.20 | 3.331 ± 0.024 | 15 |
| 26.94 | 26.94 ± 0.20 | 3.307 ± 0.024 | 13 |
| 27.53 | 27.53 ± 0.20 | 3.237 ± 0.023 | 17 |
| 28.49 | 28.49 ± 0.20 | 3.130 ± 0.022 | 16 |

TABLE 7

XRPD peaks of Form C at ambient RH

| Caption | Angle degrees (2θ) | d space (Å) | Intensity (%) |
|---|---|---|---|
| 6.91 | 6.91 ± 0.20 | 12.782 ± 0.370 | 100 |
| 7.60 | 7.60 ± 0.20 | 11.623 ± 0.305 | 49 |
| 8.67 | 8.67 ± 0.20 | 10.191 ± 0.235 | 38 |
| 11.69 | 11.69 ± 0.20 | 7.564 ± 0.129 | 73 |
| 13.89 | 13.89 ± 0.20 | 6.37 ± 0.091 | 41 |
| 14.24 | 14.24 ± 0.20 | 6.215 ± 0.087 | 66 |
| 14.84 | 14.84 ± 0.20 | 5.965 ± 0.080 | 48 |
| 15.25 | 15.25 ± 0.20 | 5.805 ± 0.076 | 9 |
| 16.81 | 16.81 ± 0.20 | 5.270 ± 0.062 | 68 |
| 17.39 | 17.39 ± 0.20 | 5.095 ± 0.058 | 4 |
| 17.69 | 17.69 ± 0.20 | 5.010 ± 0.056 | 9 |
| 18.31 | 18.31 ± 0.20 | 4.841 ± 0.052 | 82 |
| 18.52 | 18.52 ± 0.20 | 4.787 ± 0.051 | 9 |
| 19.12 | 19.12 ± 0.20 | 4.638 ± 0.048 | 4 |
| 19.47 | 19.47 ± 0.20 | 4.556 ± 0.046 | 32 |
| 20.88 | 20.88 ± 0.20 | 4.251 ± 0.040 | 21 |
| 21.21 | 21.21 ± 0.20 | 4.186 ± 0.039 | 7 |
| 21.45 | 21.45 ± 0.20 | 4.139 ± 0.038 | 13 |
| 22.01 | 22.01 ± 0.20 | 4.035 ± 0.036 | 22 |
| 22.15 | 22.15 ± 0.20 | 4.010 ± 0.036 | 35 |
| 22.98 | 22.98 ± 0.20 | 3.867 ± 0.033 | 9 |
| 23.15 | 23.15 ± 0.20 | 3.839 ± 0.033 | 6 |
| 23.43 | 23.43 ± 0.20 | 3.794 ± 0.032 | 17 |

TABLE 7-continued

XRPD peaks of Form C at ambient RH

| Caption | Angle degrees (2θ) | d space (Å) | Intensity (%) |
|---|---|---|---|
| 24.19 | 24.19 ± 0.20 | 3.676 ± 0.030 | 48 |
| 25.2 | 25.20 ± 0.20 | 3.531 ± 0.028 | 12 |
| 25.41 | 25.41 ± 0.20 | 3.502 ± 0.027 | 26 |
| 25.93 | 25.93 ± 0.20 | 3.433 ± 0.026 | 11 |
| 26.5 | 26.50 ± 0.20 | 3.361 ± 0.025 | 15 |
| 26.74 | 26.74 ± 0.20 | 3.331 ± 0.024 | 9 |
| 26.96 | 26.96 ± 0.20 | 3.305 ± 0.024 | 26 |
| 27.18 | 27.18 ± 0.20 | 3.278 ± 0.024 | 16 |
| 27.71 | 27.71 ± 0.20 | 3.217 ± 0.023 | 7 |
| 27.96 | 27.96 ± 0.20 | 3.189 ± 0.022 | 9 |
| 28.73 | 28.73 ± 0.20 | 3.105 ± 0.021 | 8 |
| 29.42 | 29.42 ± 0.20 | 3.034 ± 0.020 | 7 |
| 29.95 | 29.95 ± 0.20 | 2.981 ± 0.019 | 9 |
| 30.3 | 30.30 ± 0.20 | 2.947 ± 0.019 | 15 |

Figure 9:
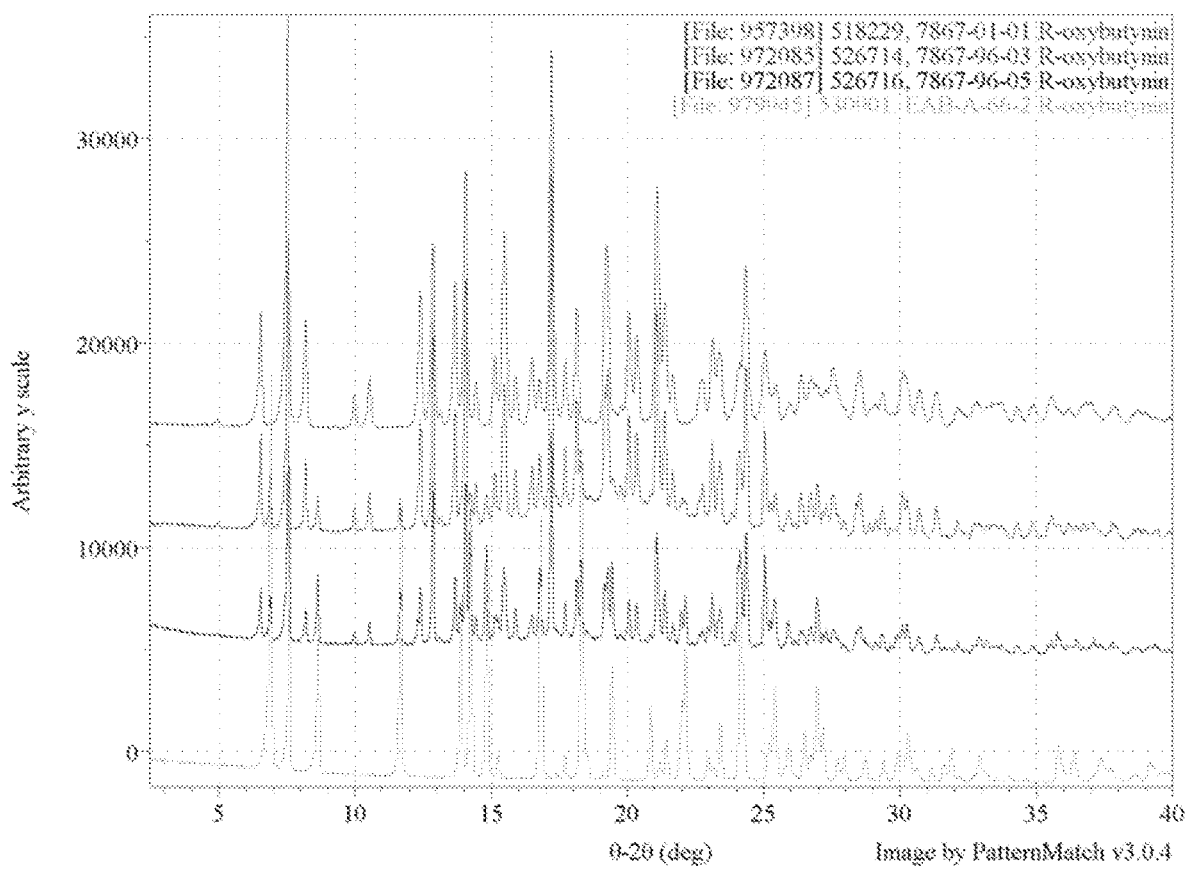
FIG. 9: Overlay with Additional peaks observed with the (R)-oxybutynin HCl Form B polymorph after 2-weeks RT Slurry in MIBK and Heptane.

Referring to FIG. 9, slurrying a mixture of the Form A and Form B (R)-oxybutynin polymorphs in methyl iso-butyl ketone (MIBK) or heptane for 2 weeks at room temperature provided a transition in the detectable peaks using XRPD where the additional peaks observed in the presence of Form B for the post-slurry samples were attributable to Form C. Still referring to FIG. 9, from top to bottom the XRPD patterns were as follows:

File 957398: R-Oxybutynin HCl Form B reference pattern (top)

File 972085: Obtained after slurrying a mixture of Form A and Form B in heptane at RT for 2 weeks File 972087: Obtained after slurrying a mixture of Form A and Form B in MIBK at RT for 2 weeks File 979945: R-Oxybutynin HCl Lot EAB-A-66-2 (bottom)

Example 27. Conversion of Racemic Oxybutynin Chloride to R-Oxybutynin Chloride

D-malic acid was identified as a potential chiral resolution salt for investigation. The objective of this study was to convert 100 grams of racemic oxybutynin chloride to R-oxybutynin chloride using D-malic acid for chiral resolution. The conversion was performed in four steps, with each step producing an isolatable crystalline solid. The four steps are shown in the scheme below.

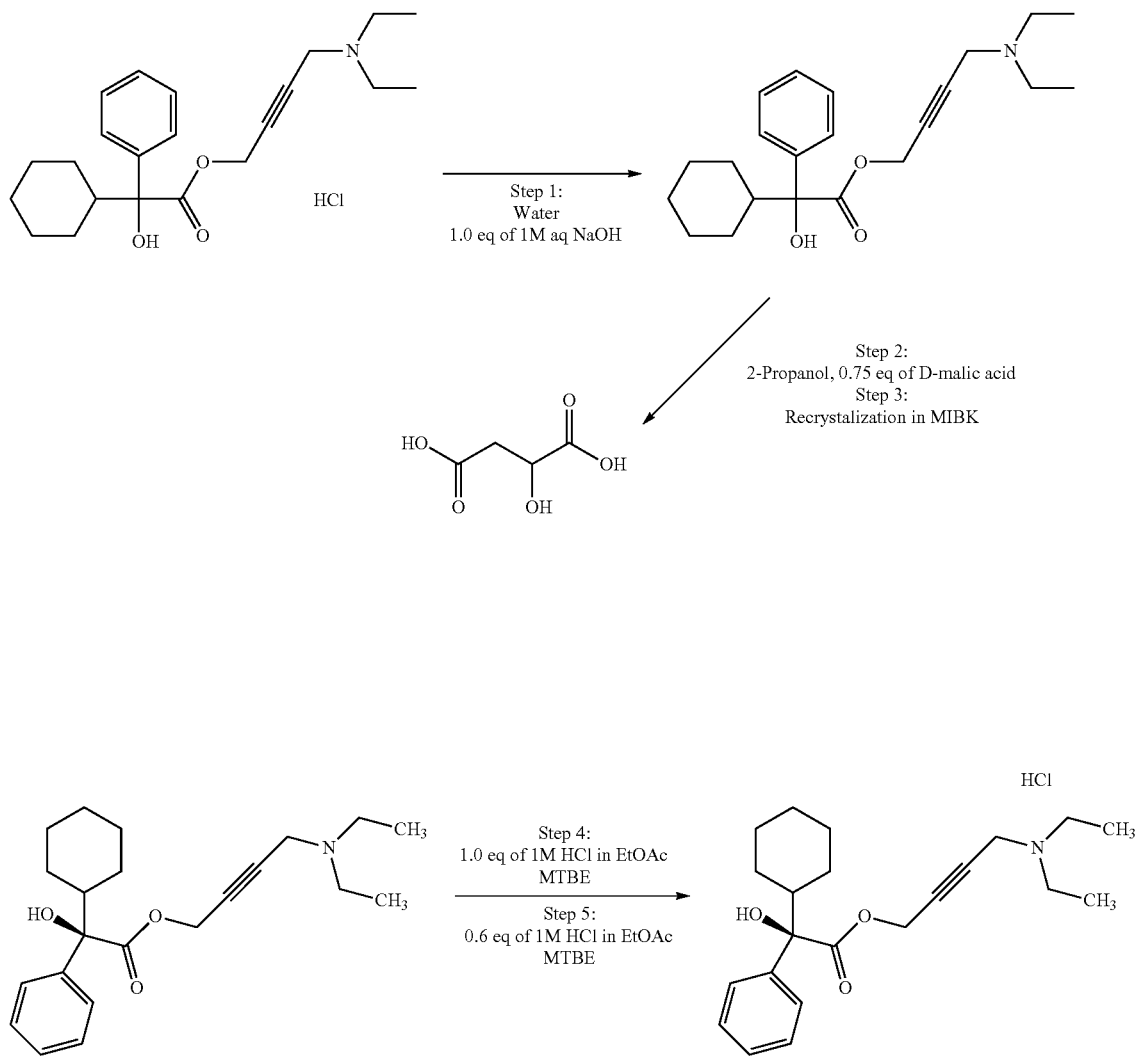

Step 1: Preparation of Racemic Oxybutynin Free Base

Racemic oxybutynin HCl salt was provided. Racemic oxybutynin HCl salt (100 g) was suspended in water (600 mL). The mixture was heated to 30° C. until dissolution was observed. Seed crystals of the crystalline free-base were added, and the mixture was held at 30° C. Aqueous sodium hydroxide (1.0 eq of 1 M solution, 254 mL) was added dropwise over 4 hours to prevent formation of a gum. During base addition, a free-flowing white slurry was observed which became thicker over time. After the completion of base addition, significant shelving of solids on the sides of the reactor was observed. The reactor temperature was set to 20° C., and the mixture stirred overnight for 19 hours. The hard solids were mostly adhered to sides of the reactor and were removed by scraping with a spatula. The solids were isolated by filtration, and then dried at 40° C. under vacuum with nitrogen bleed for 20 hours. The overall yield of racemic oxybutynin (free base) was 95% (86.1 g) with an adjusted yield of 93% after subtracting seed crystals. The solids were a white powder, determined to be crystalline racemic oxybutynin free base.

Step 2: Chiral resolution with D-malic acid

Racemic oxybutynin free base (86.1 g) was combined with 2-propanol (400 mL). The mixture was heated to 50° C., resulting in a solution. Seed crystals of the D-malate salt of R-oxybutynin were added (0.55 g), followed by solid D-malic acid (24.2 g) with a rinse of 30 mL of 2-propanol to produce R-oxybutynin D-malate. The very thin slurry was maintained at 50° C. for 1 hour, then cooled at 0.1° C./min to 20° C. and held at 20° C. for about 60 hours. An aliquot was taken to estimate yield (~30%) and chiral purity (~93% R, 86% ee) of R-oxybutynin D-malate. To increase yield, the mixture was slowly cooled at 0.1° C./min to 5° C. and held at 5° C. for 16 hours. A second aliquot indicated a slightly increased yield with comparable chiral purity (~90% R, 80% ee). The mixture was filtered. Slight shelving was observed, and the sides of the reactor were rinsed with MTBE. The combined solids were washed with additional MTBE and air-dried for 1.5 hours. The yield was 41% (49.1 g).

Step 3: Recrystallization

R-oxybutynin D-malate salt (44 g) was combined with MIBK (220 mL). The mixture was heated to 40° C. for 2 hours, cooled at 0.1° C./min to 5° C., and held at 5° C. for about 12 hours. An aliquot of the re-crystallized product indicated 97% R, 3% S (94% ee) with the filtrate indicating a higher amount of the undesired isomer (27% R, 73% S). The product was isolated by vacuum filtration and air-dried for 1 hour. The wet cake product was still very wet (14% loss of MIBK up to 50° C. by TGA). The product was dried in a vacuum oven at 40° C. with nitrogen bleed overnight. The yield of recrystallized product was 93% (40.8 g). Use of MTBE in place of MIBK is also contemplated.

Steps 4 and 5: Conversion of D-Malate Salt to R-Oxybutynin Chloride

The D-malate salt of R-oxybutynin (40.8 g) was combined with 1 M HCl in ethyl acetate (83 mL). Additional ethyl acetate was added (39 mL) and the slurry was heated to 40° C., resulting in a solution. The reactor was cooled to 20° C., and then MTBE (1220 mL) was added. The reactor was further cooled to 5° C. followed by addition of seed crystals or R-oxybutynin chloride (2.01 g) and dropwise addition of MTBE (122 mL). No gumming was observed. The moderately thick mixture was stirred at 5° C. for 2 days. The solids were isolated by filtration and dried in a vacuum oven at 40° C. for 18 hours. PXRD analysis indicated that D-malate salt had co-precipitated with the desired HCl salt, resulting in a physical mixture of the two salts. The yield was 21.1 g of the solid mixture with 98.4% R, 1.6% S (97% ee) by chiral analysis. The filtrate was concentrated to dryness in vacuo and produced 26.1 g of yellow oil with 93.6% R, 6.4% S (87% ee) by chiral analysis. The mixture of R-oxybutynin salts was combined with 1:4 ethyl acetate/MTBE (100 mL) followed by addition of 1 M HCl in ethyl acetate (24.5 mL). The mixture stirred at RT for 1.5 hours and an aliquot indicated only R-oxybutynin chloride by PXRD analysis. Additional MTBE (40 mL) was added slowly to increase the yield. A second aliquot indicated only R-oxybutynin chloride by PXRD analysis. Specifically, R-oxybutynin chloride Form C was produced. The solids were filtered and washed with about 10 mL of 1:4 ethyl acetate/MTBE, followed by vacuum drying at 40° C. with nitrogen bleed for 2 hours. The yield was 40% (13.2 g) of the R-oxybutynin chloride in 2 steps. The process to convert racemic oxybutynin chloride to R-oxybutynin chloride gave an overall yield of 13% with 99% ee with isolatable crystalline solids at each step.

Further Embodiments of the Present Invention

Embodiment E1. A crystalline form of (R)-oxybutynin HCl.

Embodiment E2. A solid form of (R)-oxybutynin HCl, having an X-ray powder diffraction pattern comprising a peak, in terms of 2-theta, at 6.9 degrees 2θ±0.2 degree 2θ at about ambient relative humidity, e.g., Form C.

Embodiment E3. A solid form of (R)-oxybutynin HCl, having an X-ray powder diffraction pattern comprising a peak, in terms of 2-theta, at 6.9 degrees 2θ±0.2 degree 2θ and/or 18.3 degrees 2θ±0.2 degree 2θ at about ambient relative humidity, e.g., Form C.

Embodiment E4. A solid form of (R)-oxybutynin HCl, having an X-ray powder diffraction pattern comprising at least two peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ at about ambient relative humidity, e.g., Form C.

Embodiment E5. A solid form of (R)-oxybutynin HCl, having an X-ray powder diffraction pattern comprising at least three peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ at about ambient relative humidity, e.g., Form C.

Embodiment E6. A solid form of (R)-oxybutynin HCl, having an X-ray powder diffraction pattern comprising at least four peaks, in terms of 2-theta, selected from the group consisting of 6.9 degrees 2θ±0.2 degree 2θ, 18.3 degrees 2θ±0.2 degree 2θ, 11.7 degrees 2θ+0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ at about ambient relative humidity, e.g., Form C.

Embodiment E7. A solid form of (R)-oxybutynin HCl, having an X-ray powder diffraction pattern comprising at least five peaks, in terms of 2-theta, selected from the group consisting of 6.9 degrees 2θ±0.2 degree 2θ, 18.3 degrees 2θ±0.2 degree 2θ, 11.7 degrees 2θ+0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ at about ambient relative humidity, e.g., Form C.

Embodiment E8. A solid form of (R)-oxybutynin HCl, having an X-ray powder diffraction pattern comprising at least seven peaks, in terms of 2-theta, selected from the group consisting of 6.9 degrees 2θ±0.2 degree 2θ, 18.3 degrees 2θ±0.2 degree 2θ, 11.7 degrees 2θ+0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Embodiment E9. A solid form of (R)-oxybutynin HCl, having an X-ray powder diffraction pattern comprising at least eight peaks, in terms of 2-theta, selected from the group consisting of 6.9 degrees 2θ±0.2 degree 2θ, 18.3 degrees 2θ±0.2 degree 2θ, 11.7 degrees 2θ+0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Embodiment E10. A solid form of (R)-oxybutynin HCl, having an X-ray powder diffraction pattern comprising at least nine peaks, in terms of 2-theta, selected from the group consisting of 6.9 degrees 2θ±0.2 degree 2θ, 18.3 degrees 2θ±0.2 degree 2θ, 11.7 degrees 2θ+0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Embodiment E11. A solid form of (R)-oxybutynin HCl, having an X-ray powder diffraction pattern comprising the peaks, in terms of 2-theta, of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity, e.g., Form C.

Embodiment E12. A solid form of (R)-oxybutynin HCl, having an X-ray powder diffraction pattern substantially as shown in FIG. 4 at ambient relative humidity.

Embodiment E13. A solid form of (R)-oxybutynin HCl, having a differential scanning calorimetry (DSC) thermogram comprising a melting onset at 109.6° C. and an endothermic peak at 119.1° C.

Embodiment E14. The solid form of Embodiments E1-E13, having a differential scanning calorimetry (DSC) thermogram substantially as shown in the bottom figure of FIG. 7.

Embodiment E15. A composition comprising (R)-oxybutynin wherein at least 5% w/w of the total amount of (R)-oxybutynin is a solid form of any one of previous Embodiments.

Embodiment E16. A composition comprising (R)-oxybutynin wherein at least 25% w/w of the total amount of (R)-oxybutynin is a solid form of any one of previous Embodiments.

Embodiment E17. A composition comprising (R)-oxybutynin wherein at least 50% w/w of the total amount of (R)-oxybutynin is a solid form of any one of previous Embodiments.

Embodiment E18. A composition comprising (R)-oxybutynin wherein at least 90% w/w of the total amount of (R)-oxybutynin is a solid form of any one of previous Embodiments.

Embodiment E19. A composition comprising (R)-oxybutynin wherein at least 95% w/w of the total amount of (R)-oxybutynin is a solid form of any one of previous Embodiments.

Embodiment E20. A composition comprising (R)-oxybutynin wherein at least 98% w/w of the total amount of (R)-oxybutynin is a solid form of any one of previous Embodiments.

Embodiment E21. A pharmaceutical composition comprising the solid form of any of Embodiments E1-E20 and one or more pharmaceutically acceptable excipients.

Embodiment E22. A process for preparing a solid form of any of Embodiments E1-E21 comprising forming a slurry with (R)-oxybutynin freebase and HCl in a solvent to form a slurry and precipitating from the slurry one or more crystals of (R)-oxybutynin hydrochloride.

Embodiment E23. The process according to Embodiment E22 wherein the solvent is selected from the group consisting of n-heptane, propyl acetate, ethyl acetate, isopropyl acetate, methyl isobutyl ketone (MIBK), methyl ethyl ketone (MEK), 1-propanol, ethanol, methyl t-butyl ether (MTBE), 1,4-dioxane, toluene, 1,2-dimethoxyethane, tetrahydrofuran, dichloromethane, acetonitrile, nitromethane, and mixtures thereof.

Embodiment E24. The process according to Embodiment E22 or E23 wherein the solvent is selected from the group consisting of ethyl acetate, heptane, methyl t-butyl ether (MTBE), and mixtures thereof.

Embodiment E25. A method of treating pharyngeal airway collapse comprising an administration to a subject in need thereof a solid form of any of Embodiments E1-E21.

Embodiment E26. The method of Embodiment E25 wherein the pharyngeal airway collapse is Obstructive Sleep Apnea (OSA), sleep apnea, or simple snoring.

Embodiment E27. A method of treating pharyngeal airway collapse comprising an administration to a subject in need thereof a solid form of (R)-oxybutynin HCl according to any of Embodiments E1-E21 in any combination with one or more of a norepinephrine reuptake inhibitor (NRI), a hypnotic, a carbonic anhydrase inhibitor, and a muscarinic receptor agonist.

Embodiment E28. A solid form of (R)-oxybutynin HCl, having an X-ray powder diffraction pattern comprising a peak, in terms of 2-theta, at 7.5 degrees 2θ±0.2 degree 2θ at about ambient relative humidity, e.g., Form B.

Embodiment E29. A solid form of (R)-oxybutynin HCl, having an X-ray powder diffraction pattern comprising a peak, in terms of 2-theta, at 7.5 degrees 2θ±0.2 degree 2θ and/or 17.2 degrees 2θ±0.2 degree 2θ at about ambient relative humidity, e.g., Form B.

Embodiment E30. A solid form of (R)-oxybutynin HCl, having an X-ray powder diffraction pattern comprising at least two peaks, in terms of 2-theta, selected from the group consisting of 7.5 degrees 2θ±0.2 degree 2θ, 17.2 degrees 2θ±0.2 degree 2θ, and 14.1 degrees 2θ±0.2 degree 2θ at about ambient relative humidity, e.g., Form B.

Embodiment E31. A solid form of (R)-oxybutynin HCl, having an X-ray powder diffraction pattern comprising at least three peaks, in terms of 2-theta, selected from the group consisting of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, and 15.5 degrees 2θ±0.2 degree 2θ at about ambient relative humidity, e.g., Form B.

Embodiment E32. A solid form of (R)-oxybutynin HCl, having an X-ray powder diffraction pattern comprising the peaks, in terms of 2-theta, of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, 15.5 degrees 2θ±0.2 degree 2θ, 12.9 degrees 2θ±0.2 degree 2θ, 19.3 degrees 2θ±0.2 degree 2θ, 24.4 degrees 2θ±0.2 degree 2θ, 13.7 degrees 2θ±0.2 degree 2θ, 12.4 degrees 2θ±0.2 degree 2θ, 21.4 degrees 2θ±0.2 degree 2θ, 18.1 degrees 2θ±0.2 degree 2θ, 20.1 degrees 2θ±0.2 degree 2θ, 6.6 degrees 2θ±0.2 degree 2θ, 8.2 degrees 2θ±0.2 degree 2θ, and 20.4 degrees 2θ±0.2 degree 2θ, at about ambient relative humidity, e.g., Form B.

Embodiment E33. A solid form of (R)-oxybutynin HCl having an X-ray powder diffraction pattern substantially as shown in FIG. 3 at about ambient relative humidity.

Embodiment E34. A pharmaceutical composition comprising a solid form according to any one of Embodiments E1-E21 and/or E28-E33 and one or more pharmaceutically acceptable excipients.

Embodiment E35. A method of treating pharyngeal airway collapse comprising an administration to a subject in need thereof a solid form of any of Embodiments E1-E21 and/or E28-E33.

Embodiment E36. The method of Embodiment E35 wherein the pharyngeal airway collapse is Obstructive Sleep Apnea (OSA), sleep apnea, or simple snoring.

Embodiment E37. A method of treating pharyngeal airway collapse comprising an administration to a subject in need thereof a solid form of (R)-oxybutynin HCl according to any of Embodiments E1-E21 and/or E28-E33 in any combination with one or more of a norepinephrine reuptake inhibitor (NRI), a hypnotic, a carbonic anhydrase inhibitor, and a muscarinic receptor agonist.

Embodiment E38. A solid form of (R)-oxybutynin HCl that is a solvate.

Embodiment E39. The solid form of (R)-oxybutynin HCl of Embodiment E38 that is an isopropanol solvate.

Embodiment E40. A solid form of (R)-oxybutynin HCl, having an X-ray powder diffraction pattern comprising a peak, in terms of 2-theta, at 19.2 degrees 2θ±0.2 degree 2θat about ambient relative humidity, e.g., Form A.

Embodiment E41. A solid form of (R)-oxybutynin HCl, having an X-ray powder diffraction pattern comprising a peak, in terms of 2-theta, at 19.2 degrees 2θ±0.2 degree 2θand/or 6.1 degrees 2θ±0.2 degree 2θat about ambient relative humidity, e.g., Form A.

Embodiment E42. A solid form of (R)-oxybutynin HCl, having an X-ray powder diffraction pattern comprising at least two peaks, in terms of 2-theta, selected from the group consisting of 19.2 degrees 2θ±0.2 degree 2θ, 6.1 degrees 2θ±0.2 degree 2θ, and 7.7 degrees 2θ±0.2 degree 2θat about ambient relative humidity, e.g., Form A.

Embodiment E43. A solid form of (R)-oxybutynin HCl, having an X-ray powder diffraction pattern comprising at least three peaks, in terms of 2-theta, selected from the group consisting of 19.2 degrees 2θ±0.2 degree 2θ, 6.1 degrees 2θ±0.2 degree 2θ, 7.7 degrees 2θ±0.2 degree 2θ, 12.9 degrees 2θ±0.2 degree 2θ, and 21.6 degrees 2θ±0.2 degree 2θat about ambient relative humidity, e.g., Form A.

Embodiment E44. A solid form of (R)-oxybutynin HCl, having an X-ray powder diffraction pattern comprising at least four peaks, in terms of 2-theta, selected from the group consisting of 19.2 degrees 2θ±0.2 degree 2θ, 6.1 degrees 2θ±0.2 degree 2θ, 7.7 degrees 2θ±0.2 degree 2θ, 12.9 degrees 2θ±0.2 degree 2θ, 21.6 degrees 2θ±0.2 degree 2θ, 18.3 degrees 2θ±0.2 degree 2θ, and 15.5 degrees 2θ±0.2 degree 2θat about ambient relative humidity, e.g., Form A.

Embodiment E45. A solid form of (R)-oxybutynin HCl, having an X-ray powder diffraction pattern comprising the peaks, in terms of 2-theta, of 19.2 degrees 2θ±0.2 degree 2θ, 6.1 degrees 2θ±0.2 degree 2θ, 7.7 degrees 2θ±0.2 degree 2θ, 12.9 degrees 2θ±0.2 degree 2θ, 21.6 degrees 2θ±0.2 degree 2θ, 18.3 degrees 2θ±0.2 degree 2θ, 15.5 degrees 2θ±0.2 degree 2θ, 22.8 degrees 2θ±0.2 degree 2θ, 16.7 degrees 2θ±0.2 degree 2θ, 17.6 degrees 2θ±0.2 degree 2θ, 19.5 degrees 2θ±0.2 degree 2θ, 14.6 degrees 2θ±0.2 degree 2θ, and 20.8 degrees 2θ±0.2 degree 2θ, at about ambient relative humidity, e.g., Form A.

Embodiment E46. A solid form of (R)-oxybutynin HCl having an X-ray powder diffraction pattern substantially as shown in FIG. 2 at ambient relative humidity.

Embodiment E47. A pharmaceutical composition comprising a solid form according to any one of Embodiments E1-E21, E28-E33, and/or E38-E46 and one or more pharmaceutically acceptable excipients.

Embodiment E48. A method of treating pharyngeal airway collapse comprising an administration to a subject in need thereof a solid form of any of Embodiments E1-E21, E28-E33, and/or E38-E46.

Embodiment E49. The method of Embodiment E48 wherein the pharyngeal airway collapse is Obstructive Sleep Apnea (OSA), sleep apnea, or simple snoring.

Embodiment E50. A method of treating pharyngeal airway collapse comprising an administration to a subject in need thereof a solid form of (R)-oxybutynin HCl according to any of Embodiments E1-E21, E28-E33, and/or E38-E46 in any combination with one or more of a norepinephrine reuptake inhibitor (NRI), a hypnotic, a carbonic anhydrase inhibitor, and a muscarinic receptor agonist.

Embodiment E51. A solid form of (R)-oxybutynin HCl that is amorphous.

Embodiment E52. A form of (R)-oxybutynin HCl as an amorphous material in a dispersion matrix.

Although specific embodiments of the present invention are herein illustrated and described in detail, the invention is not limited thereto. The above detailed descriptions are provided as exemplary of the present invention and should not be construed as constituting any limitation of the invention. Modifications will be obvious to those skilled in the art, and all modifications that do not depart from the spirit of the invention are intended to be included with the scope of the appended claims.

The invention claimed is:

1. A solid crystalline form of (R)-oxybutynin HCl, designated as Form C.

2. The solid crystalline form of claim 1, having an X-ray powder diffraction pattern comprising at least three peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θand 14.2 degrees 2θ±0.2 degree 2θ, at about ambient relative humidity.

3. The solid crystalline form of claim 1, having an X-ray powder diffraction pattern comprising at least four peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, and 14.8 degrees 2θ±0.2 degree 2θ, at about ambient relative humidity.

4. The solid crystalline form of claim 1, having an X-ray powder diffraction pattern comprising at least five peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, and 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity.

5. The solid crystalline form of claim 1, having an X-ray powder diffraction pattern comprising at least seven peaks, in terms of 2-theta, selected from the group consisting of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity.

6. The solid crystalline form of claim 1, having an X-ray powder diffraction pattern comprising the peaks, in terms of 2-theta, of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, 14.2 degrees 2θ±0.2 degree 2θ, 7.6 degrees 2θ±0.2 degree 2θ, 14.8 degrees 2θ±0.2 degree 2θ, 24.2 degrees 2θ±0.2 degree 2θ, 13.9 degrees 2θ±0.2 degree 2θ, and 8.7 degrees 2θ±0.2 degree 2θ, at about ambient relative humidity.

7. The solid crystalline form of claim 1, having an X-ray powder diffraction pattern substantially as shown in FIG. 4 at about ambient relative humidity.

8. The solid crystalline form of claim 1, having a differential scanning calorimetry (DSC) thermogram comprising a melting onset at 109.6° C. and an endothermic peak at 119.1° C.

9. The solid crystalline form of claim 8, having a differential scanning calorimetry (DSC) thermogram substantially as shown in FIG. 7.

10. A solid crystalline form of (R)-oxybutynin HCl, having a combination of the Form B and Form C polymorphs as shown in FIG. 9.

11. A pharmaceutical composition comprising the solid crystalline form of claim 1 and one or more pharmaceutically acceptable excipients.

12. A process for preparing the solid crystalline form of claim 1, comprising precipitating the solid crystalline form from a solution comprising (R)-oxybutynin HCl and a solvent, or slurrying (R)-oxybutynin HCl in a solvent, wherein the solvent comprises an organic solvent excluding methanol, and the content of water is at or below 5% v/v.

13. The process according to claim 12, wherein the organic solvent is selected from the group consisting of n-heptane, propyl acetate, ethyl acetate, isopropyl acetate, methyl isobutyl ketone (MIBK), methyl ethyl ketone (MEK), 1-propanol, ethanol, methyl t-butyl ether (MTBE), 1,4-dioxane, toluene, 1,2-dimethoxyethane, tetrahydrofuran, dichloromethane, acetonitrile, nitromethane, and mixtures thereof.

14. The process of claim 13, wherein the organic solvent is MTBE.

15. A method of treating a condition associated with pharyngeal airway collapse comprising administering to a subject in need thereof the solid crystalline form of claim 1.

16. The method of claim 15, wherein the condition associated with pharyngeal airway collapse is sleep apnea or snoring.

17. The method of claim 15, wherein the condition associated with pharyngeal airway collapse is Obstructive Sleep Apnea (OSA).

18. A solid crystalline form of (R)-oxybutynin HCl, designated as Form A.

19. The solid crystalline form of claim 18, having an X-ray powder diffraction pattern substantially as shown in FIG. 2 at about ambient relative humidity.

20. A solid crystalline form of (R)-oxybutynin HCl, designated as Form B.

21. The solid crystalline form of claim 20, having an X-ray powder diffraction pattern substantially as shown in FIG. 3 at about ambient relative humidity.

22. A pharmaceutical composition comprising a solid crystalline form of (R)-oxybutynin HCl according to claim 20 and optionally one or more pharmaceutically acceptable excipients.

23. A solid crystalline form of (R)-oxybutynin citrate.

24. A pharmaceutical composition comprising a solid crystalline form of (R)-oxybutynin citrate according to claim 23 and optionally one or more pharmaceutically acceptable excipients.

25. A process for producing crystalline R-oxybutynin HCl of Form C, the process comprising:
   isolating (R)-oxybutynin from racemic oxybutynin via chiral resolution with D-malic acid; and
   adding HCl to the isolated (R)-oxybutynin to produce crystalline (R)-oxybutynin HCl of Form C.

26. The process of claim 25, wherein isolating (R)-oxybutynin from racemic oxybutynin comprises adding D-malic acid to racemic oxybutynin free base.

27. The process of claim 26, wherein D-malic acid is added to racemic oxybutynin free base in the presence of 2-propanol.

28. The process of claim 25, wherein the HCl is added in the presence of ethyl acetate.

29. The process of claim 25, further comprising adding MTBE to the isolated (R)-oxybutynin after addition of HCl.

30. The solid crystalline form of claim 1, having an X-ray powder diffraction pattern comprising the peaks, in terms of 2-theta, of 6.9 degrees 2θ±0.2 degree 2θ, 18.3 degrees 2θ±0.2 degree 2θ, and 11.7 degrees 2θ±0.2 degree 2θ, at about ambient relative humidity.

31. The solid crystalline form of claim 1, having an X-ray powder diffraction pattern comprising the peaks, in terms of 2-theta, of 6.9 degrees 2θ±0.2 degree 2θ, 18.3 degrees 2θ±0.2 degree 2θ, 11.7 degrees 2θ±0.2 degree 2θ, 16.8 degrees 2θ±0.2 degree 2θ, and 14.2 degrees 2θ±0.2 degree 2θ, at about ambient relative humidity.

32. The solid crystalline form of claim 20, having an X-ray powder diffraction pattern comprising the peaks, in terms of 2-theta, of 7.5 degrees 2θ±0.2 degree 2θ, 17.2 degrees 2θ±0.2 degree 2θ, and 14.1 degrees 2θ±0.2 degree 2θ, at about ambient relative humidity.

33. The solid crystalline form of claim 20, having an X-ray powder diffraction pattern comprising at least three peaks, in terms of 2-theta, selected from the group consisting of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, and 15.5 degrees 2θ±0.2 degree 2θ, at about ambient relative humidity.

34. The solid crystalline form of claim 20, having an X-ray powder diffraction pattern comprising the peaks, in terms of 2-theta, of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, and 15.5 degrees 2θ±0.2 degree 2θ, at about ambient relative humidity.

35. The solid crystalline form of claim 20, having an X-ray powder diffraction pattern comprising at least ten peaks, in terms of 2-theta, selected from the group consisting of 7.5 degrees 2θ±0.2 degree 2θ, 17.2 degrees 2θ±0.2 degree 2θ, 14.1 degrees 2θ±0.2 degree 2θ, 21.1 degrees 2θ±0.2 degree 2θ, 15.5 degrees 2θ±0.2 degree 2θ, 12.9 degrees 2θ±0.2 degree 2θ, 19.3 degrees 2θ±0.2 degree 2θ, 24.4 degrees 2θ±0.2 degree 2θ, 13.7 degrees 2θ±0.2 degree 2θ, 12.4 degrees 2θ±0.2 degree 2θ, 21.4 degrees 2θ±0.2 degree 2θ, 18.1 degrees 2θ±0.2 degree 2θ, 20.1 degrees 2θ±0.2 degree 2θ, 6.6 degrees 2θ±0.2 degree 2θ, 8.2 degrees 2θ±0.2 degree 2θ, and 20.4 degrees 2θ±0.2 degree 2θ, at about ambient relative humidity.

36. The solid crystalline form of claim 20, having a differential scanning calorimetry (DSC) thermogram displaying a melting onset at about 40° C. and an endothermic peak at 64.8° C.

37. The process of claim 12, wherein the organic solvent is selected from the group consisting of ethyl acetate, heptane, methyl t-butyl ether (MTBE), and mixtures thereof.

38. The process of claim 37, wherein the organic solvent is heptane.

\* \* \* \* \*